(12) United States Patent
Ohishi et al.

(10) Patent No.: US 10,198,793 B2
(45) Date of Patent: Feb. 5, 2019

(54) IMAGE PROCESSING APPARATUS, IMAGE PROCESSING METHOD, AND X-RAY DIAGNOSIS APPARATUS

(71) Applicant: Toshiba Medical Systems Corporation, Otawara-shi (JP)

(72) Inventors: Satoru Ohishi, Otawara (JP); Kunio Shiraishi, Otawara (JP); Hisato Takemoto, Amherst, MA (US)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/717,511

(22) Filed: May 20, 2015

(65) Prior Publication Data
US 2015/0269711 A1  Sep. 24, 2015

Related U.S. Application Data

(63) Continuation of application No. PCT/JP2013/081329, filed on Nov. 20, 2013.

(30) Foreign Application Priority Data

Nov. 20, 2012 (JP) ................................. 2012-254651

(51) Int. Cl.
*G06K 9/00* (2006.01)
*G06T 5/00* (2006.01)
(Continued)

(52) U.S. Cl.
CPC ............ *G06T 5/002* (2013.01); *G06K 9/4604* (2013.01); *G06T 5/20* (2013.01); *G06T 7/0012* (2013.01);
(Continued)

(58) Field of Classification Search
CPC ........... G06T 5/002; G06T 2207/10012; G06T 2207/10116; G06T 2207/20012;
(Continued)

(56) References Cited

U.S. PATENT DOCUMENTS 6,490,476 B1 * 12/2002 Townsend .............. A61B 6/032
250/363.03
7,774,041 B2    8/2010 Nambu et al.
(Continued)

FOREIGN PATENT DOCUMENTS

CN        1989906 A     7/2007
CN      101032409 A     9/2007
(Continued)

OTHER PUBLICATIONS

International Search Report dated Jan. 14, 2014 for PCT/JP2013/081329 filed on Nov. 20, 2013 in English Language.
(Continued)

*Primary Examiner* — Tom Y Lu
(74) *Attorney, Agent, or Firm* — Oblon, McClelland, Maier & Neustadt, L.L.P.

(57) ABSTRACT

An image processing apparatus includes a processor that acquires medical image data and performs noise reduction in at least two of three different directions in the medical image data in a predetermined order.

27 Claims, 17 Drawing Sheets

(51) Int. Cl.
*G06T 5/20* (2006.01)
*G06K 9/46* (2006.01)
*G06T 7/00* (2017.01)

(52) U.S. Cl.
CPC .............. *G06T 2207/10012* (2013.01); *G06T 2207/10081* (2013.01); *G06T 2207/10088* (2013.01); *G06T 2207/10116* (2013.01); *G06T 2207/20012* (2013.01); *G06T 2207/20024* (2013.01); *G06T 2207/20182* (2013.01); *G06T 2207/30101* (2013.01)

(58) Field of Classification Search
CPC . G06T 2207/20024; G06T 2207/20182; G06T 2207/30101; G06T 5/20; G06T 7/0012; G06K 9/4604
See application file for complete search history.

(56) References Cited

U.S. PATENT DOCUMENTS

| | | | |
|---|---|---|---|
| 7,826,885 B2 | 11/2010 | Nambu et al. | |
| 8,358,866 B2 * | 1/2013 | Qian | G06T 5/10 358/3.26 |
| 2004/0066978 A1 | 4/2004 | Nanbu | |
| 2005/0090740 A1 * | 4/2005 | Raitzer | A61B 8/12 600/437 |
| 2006/0029285 A1 * | 2/2006 | Hein | G06T 5/50 382/260 |
| 2007/0019851 A1 | 1/2007 | Nishide et al. | |
| 2007/0040831 A1 | 2/2007 | Flohr et al. | |
| 2007/0172104 A1 * | 7/2007 | Nishide | A61B 6/032 382/131 |
| 2009/0097612 A1 * | 4/2009 | Rauch | A61B 6/032 378/19 |
| 2011/0054656 A1 * | 3/2011 | Lee | G06T 3/0068 700/98 |
| 2012/0148123 A1 * | 6/2012 | Gindele | G06T 7/11 382/128 |
| 2012/0298859 A1 * | 11/2012 | Tanji | H01J 49/0036 250/282 |

FOREIGN PATENT DOCUMENTS

| | | |
|---|---|---|
| CN | 101744623 A | 6/2010 |
| JP | H07-134772 A | 5/1995 |
| JP | 2007-21021 A | 2/2007 |
| JP | 2007-50259 A | 3/2007 |
| JP | 2008-161693 A | 7/2008 |
| JP | 4170767 B2 | 8/2008 |
| JP | 2009-098100 A | 5/2009 |
| JP | 2013-244046 A | 12/2013 |
| WO | WO 2005/046478 A1 | 5/2005 |

OTHER PUBLICATIONS

Nambu, K., et al., "A Noise Reduction Method Based on a Statistical Test of High Dimensional Pixel Vectors for Dynamic and Volumetric Images," *Rivista di Neuroradiologia*, vol. 18, 2005, pp. 21-33.

Nishiki, M., et al., "Method for reducing noise in X-ray images by averaging pixels based on the normalized difference with the relevant pixel," *Radiol Phys Technol*, 2008, 8 pages.

Combined Chinese Office Action and Search Report dated May 30, 2016 in Patent Application No. 201380060486.1 (with English translation of categories of cited documents).

Office Action dated Oct. 16, 2017, in Chinese Patent Application No. 201380060486.1.

* cited by examiner

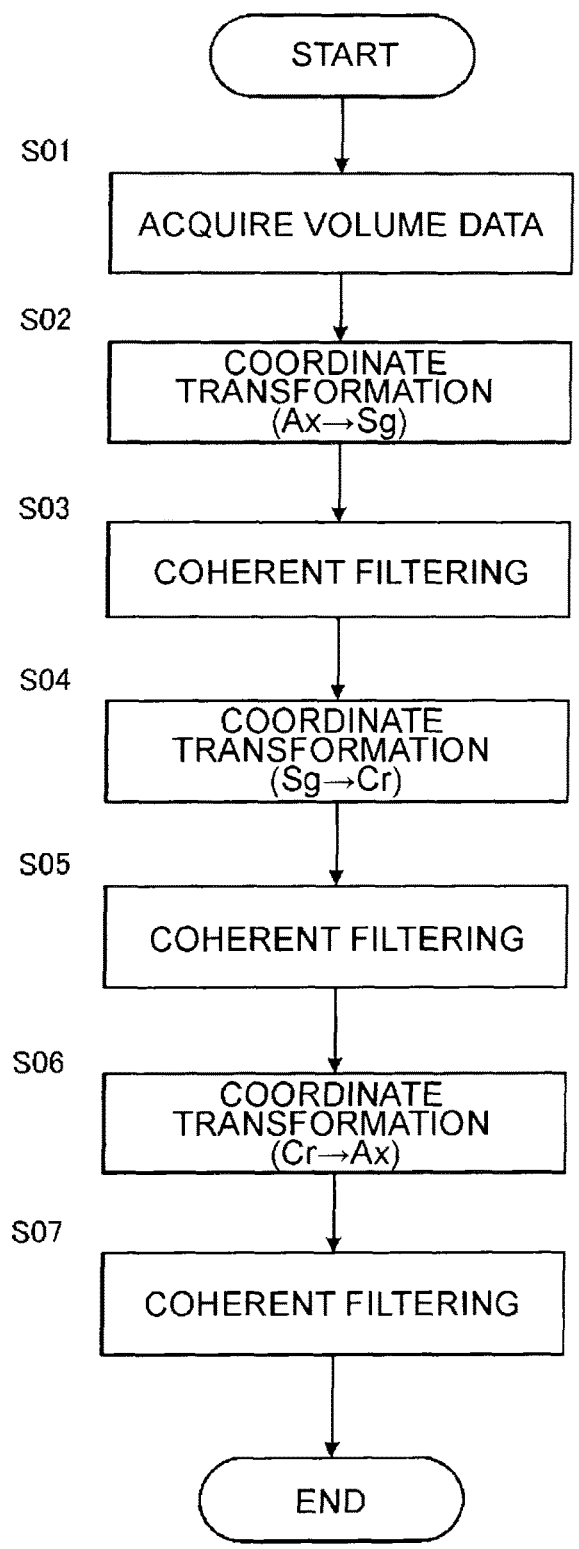

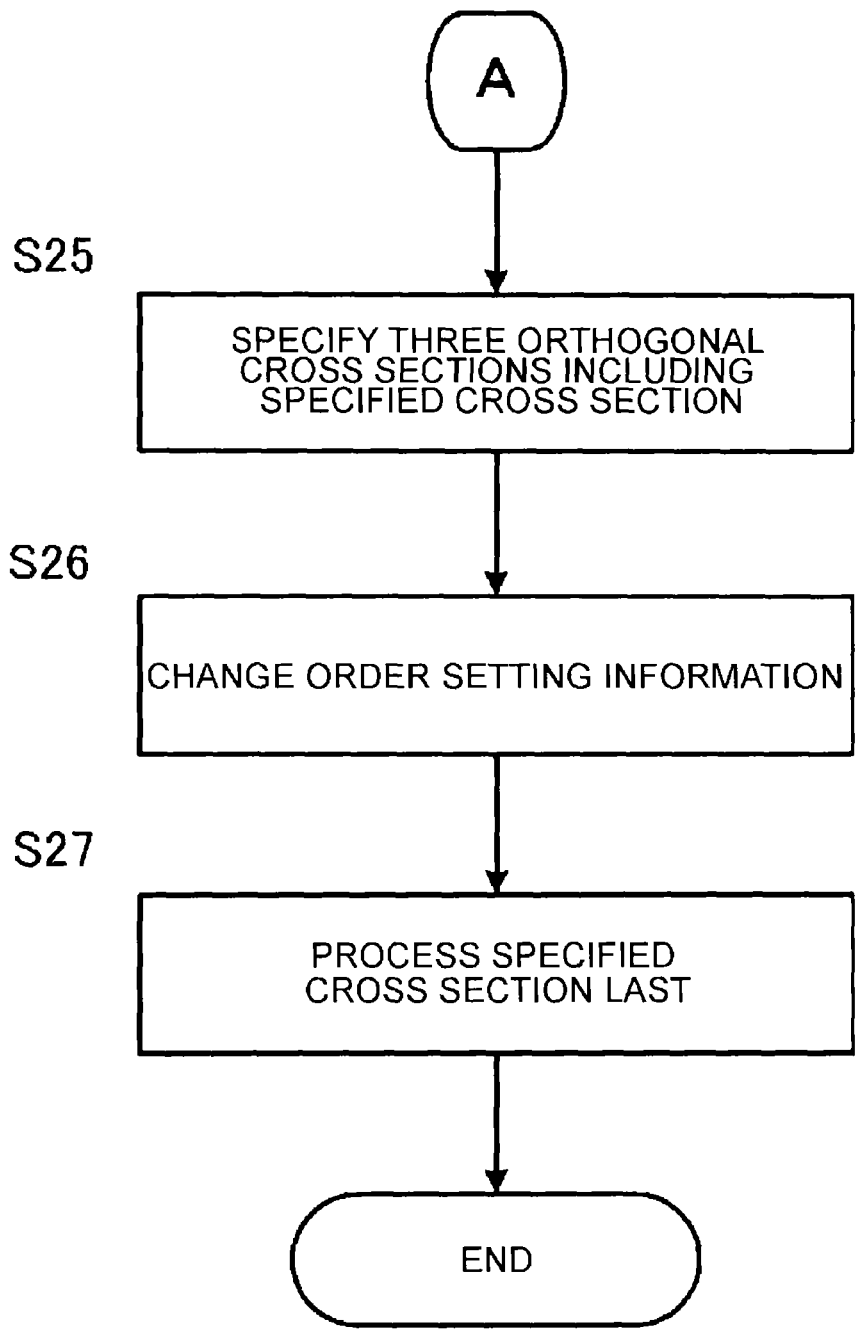

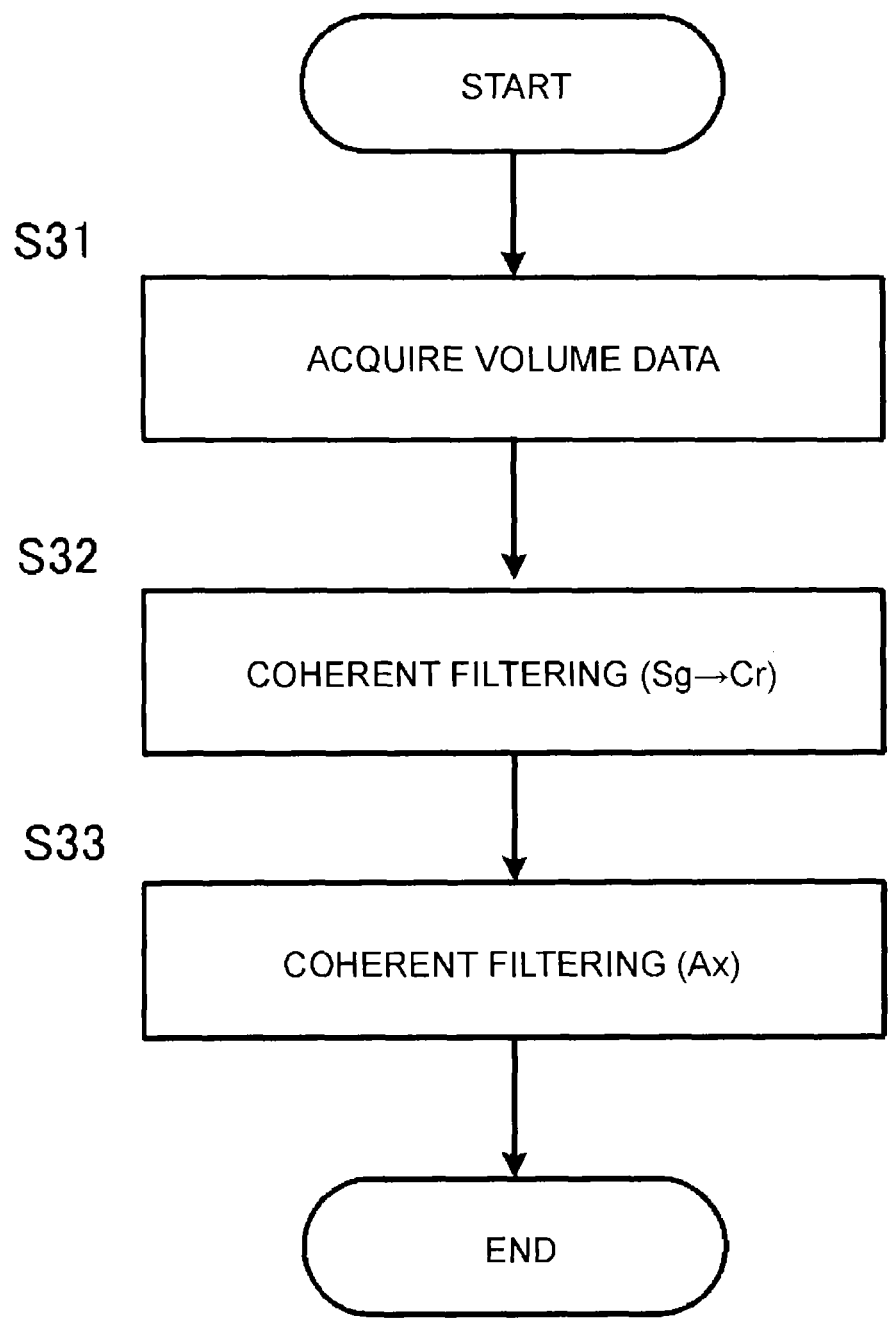

IMAGE PROCESSING APPARATUS, IMAGE PROCESSING METHOD, AND X-RAY DIAGNOSIS APPARATUS

CROSS-REFERENCE TO RELATED APPLICATION

This application is based upon and claims the benefit of priority from Japanese Patent Application No. 2012-254651, filed 20 Nov. 2012; the entire contents of which are incorporated herein by reference.

FIELD

Embodiments described herein relate generally to an image processing apparatus, an image processing method, and an X-ray diagnosis apparatus.

BACKGROUND

Nowadays image processing techniques have come to be used in a variety of fields.

For example, image processing is performed to address the degradation or modification of images acquired by a video recorder, a digital camera, or the like. In addition, image processing may be performed with a view to clearly understand the pattern of the structure and the structure itself to inspect whether the structure is built as designed.

In medical institutions, a medical image diagnosis apparatus is used to obtain information on tissues in a subject. The medical image diagnosis apparatus creates from the information a medical image such as, for example, a perspective image, a tomographic image, and a blood flow image. The medical image is used for examination and diagnosis. Various types of image processing is performed to modify medical images in a variety of medical image diagnosis apparatuses such as, for example, X-ray computed tomography (CT) systems, magnetic resonance imaging (MRI) equipment, ultrasound diagnosis apparatuses, and X-ray diagnosis apparatuses. The utility of image processing to visualize a blood flow or a flow of a contrast agent, or to extract a lesion, contour of internal organs and the like is widely recognized.

The image processing uses various types of elemental technologies such as noise removal or reduction, feature extraction, and pattern recognition. These technologies are used alone or in combination as appropriate. Among such elemental technologies, a technology to reduce random noise in an image is used to clearly reproduce an object photographed or reconstructed.

However, conventional image processing, in particular noise reduction, requires further improvements. For example, smoothing is widely known as a noise reduction technology. Smoothing refers to processing in which, when an input value f(i, j) is provided for a pixel (i, j), the average density of neighboring pixels around the pixel (i, j) is used as an output value g(i, j) of the pixel (i, j). Specifically, assuming that n×n pixels in the vicinity of the pixel (i, j) are used as the neighboring pixels, the output value g(i, j) is obtained by the following formula (1):

[Formula 1]

$$g(i, j) = \sum_{k=a}^{b} \sum_{m=c}^{d} \frac{1}{(b-a+1)(d-c+1)} \cdot f(i+k, j+m) \quad (1)$$

where a, b, c, and d are integers, and 1/(b−a+1)(d−c+1) is a so-called weight.

However, the simple use of this noise reduction may result in a so-called "edge blur". The edge blur reduces the spatial resolution of an image, and the entire image is blurred. When the above noise reduction using formula (1) is applied to a medical image described above, for example, even if it is desired that a detailed blood vessel structure be rendered with as little noise as possible, pixels other than those of the blood vessel structure are also averaged (smoothed). That is, while reducing the noise, the smoothing also reduces the contrast that represents the blood vessel structure. As a result, it may be difficult to illustrate the detailed blood vessel structure.

For this reason, there has been proposed an image processing apparatus that calculates the similarity between each pixel and neighboring pixels around the pixel in an image, and obtains a weighted average of them according to the similarity. The image processing apparatus uses the weighted average as a pixel value of the pixel. Thus, the image processing apparatus is capable of both suppressing image blur and reducing noise.

Besides, as with a medical image acquisition device, the image processing apparatus may acquire information on the three-dimensional region of an object. Volume data is generated based on the information on the three-dimensional region thus acquired. The volume data is formed of a three-dimensional array of voxels (pixels). Each voxel is assigned with information (pixel value, etc.) indicating the density or the like of the object in the region.

Further, in the image processing apparatus, noise reduction is performed on volume data as described above. For example, there is an image processing apparatus that performs noise reduction (two-dimensional noise reduction) with respect to any cross section of volume data to thereby achieve noise reduction of the entire volume data by isotropically diffusing the processing contents. At this time, the degree of the diffusion is determined depending on whether the region of interest includes edge information or not. For another example, there is an image processing apparatus that performs noise reduction by averaging or the like (three-dimensional noise reduction) for each voxel in the entire volume data.

Further, in the image processing apparatus, noise reduction is performed between frames acquired in different time phases. For example, the noise reduction is performed by the use of corresponding pixels in the frames acquired in different time phases.

In noise reduction for volume data, in the case of two-dimensional noise reduction, noise may not be sufficiently reduced. Besides, when a different cross section other than the one that is subjected to noise reduction (e.g., a cross section in a different cross-section direction) is observed, there is a case where the noise reduction is not appropriate. In other words, if the object is a human body, information that each voxel has in volume data is unlikely to be uniform. That is, there is likely to be a difference between a cross section subjected to the noise reduction and the different cross section in nature such as the tendency of the distribution of pixel values of pixels. As a result, even if noise reduction is performed on a predetermined cross section in volume data, for example, the noise reduction is not always applicable to a cross section perpendicular to the cross section. Accordingly, signal such as artifacts may appear in a critical area in an image. The same applies to the case where noise reduction is performed between frames acquired in different time phases.

Further, there is a possibility that, when two-dimensional noise reduction is performed a plurality of times on the same cross section to achieve higher noise reduction effect, an edge portion of the image in the cross section is blurred. This is significant in the different cross sections.

On the other hand, in the case of three-dimensional noise reduction, the amount of computation required for the processing is huge. This is, for example, the case that weighted average is performed according to the similarity between each voxel and those around it. As a result, the processing time may be increased by three-dimensional noise reduction.

BRIEF DESCRIPTION OF THE DRAWINGS

FIG. 2 is a flowchart of a sequence of noise reduction processing performed by the image processing apparatus of the first embodiment;

FIG. 10 is a flowchart of a sequence of the operation of the image processing apparatus of the third embodiment;

FIG. 11 is a flowchart of a sequence of the operation of an image processing apparatus according to a fourth embodiment;

DETAILED DESCRIPTION

In general, according to one embodiment, an image processing apparatus includes a processor that acquires medical image data and performs noise reduction in at least two of three different directions in the medical image data in a predetermined order.

Referring now to FIGS. 1 to 13B, a description is given of an image processing apparatus according to first to sixth embodiments.

First Embodiment

Figure 1:
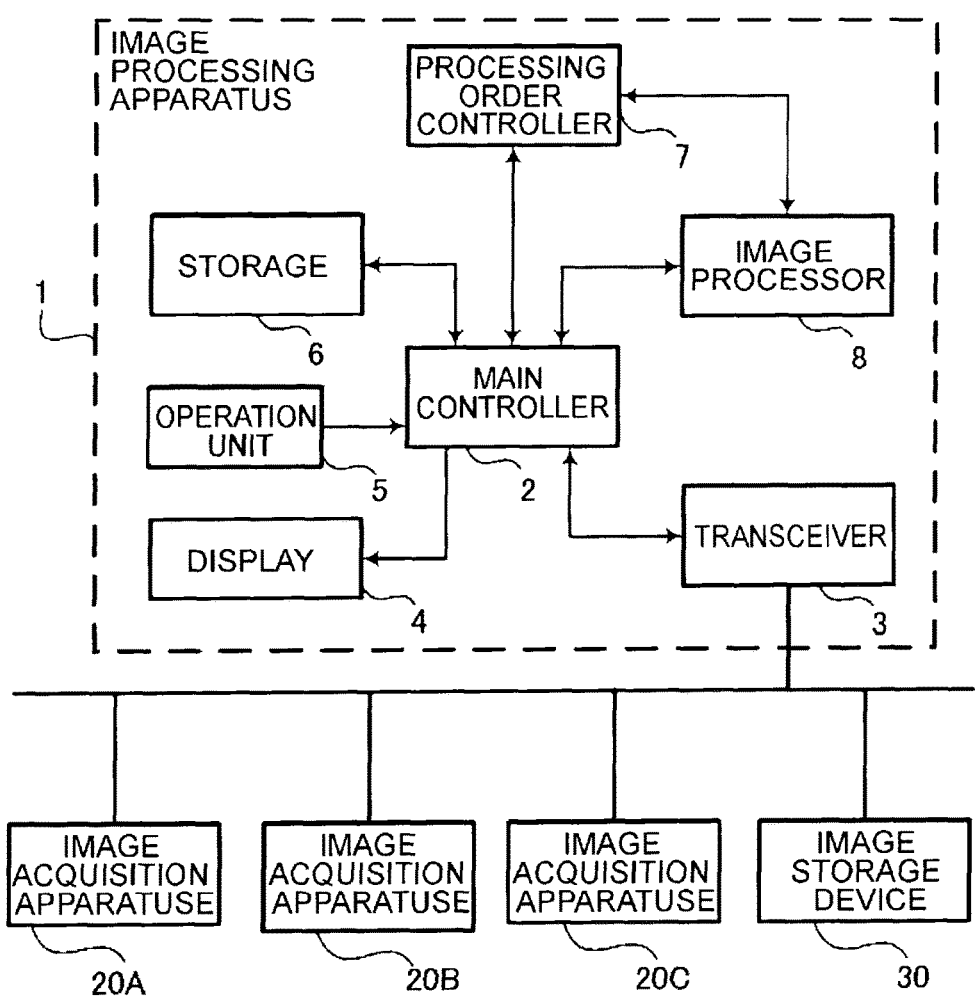
FIG. 1 is a schematic block diagram of an image processing apparatus according to a first embodiment.

With reference to FIGS. 1 to 3C, a description is given of an image processing apparatus according to the first embodiment. FIG. 1 is a schematic block diagram of an image processing apparatus 1 of the first embodiment. A medical image workstation is described as an example of the image processing apparatus 1 of the first embodiment. In the first embodiment, the image processing apparatus 1 obtains volume data relating to a medical image, and performs noise reduction on three cross sections perpendicular to one another (three orthogonal cross sections) in the volume data in a predetermined order. In the following, an example is described in which the image processing apparatus 1 retrieves volume data acquired in advance by any one of image acquisition apparatuses (20A to 20C) and stored in an image storage device 30. For another example, the image processing apparatus may perform collection of information on the body tissues of a subject, reconstruction, and generation of volume data as in the fourth embodiment described below.

(General Structure of Image Processing Apparatus and External Device)

As illustrated in FIG. 1, the image processing apparatus 1 of the first embodiment includes a main controller 2, a transceiver 3, a display 4, an operation unit 5, a storage 6, a processing order controller 7, and an image processor 8. The image processing apparatus 1 is connected to a plurality of image acquisition apparatuses 20A, 20B, 20C, . . . , and 20n via a network. The image processing apparatus 1 is also connected to the image storage device 30 through the network. The image processing apparatus 1 retrieves volume data from the image storage device 30 or the like through the transceiver 3 according to an indication signal from the main controller 2. Although FIG. 1 illustrates the image acquisition apparatuses 20A, 20B, 20C, and the image storage device 30 connected to the network as an example, the number of the devices can be set arbitrarily. Incidentally, in the following example, the image acquisition apparatus 20A and the like are described as a medical image acquisition apparatus that collects information on the body tissues of a subject and the like. The image acquisition apparatus may be, for example, an X-ray diagnosis apparatus, an X-ray CT system, an MRI equipment, and an ultrasound diagnosis apparatus.

The image storage device 30 is, for example, based on picture archiving and communication system (PACS). For example, the image storage device 30 is an image management apparatus that has an image database. The image management apparatus manages medical image data in the image database according to a program. For another example, the image storage device 30 may be a file server that stores medical image data, such as a network attached storage (NAS).

<Controller>

The main controller 2 includes, for example, a central processing unit (CPU), a read only memory (ROM), a random access memory (RAM), and the like. The ROM stores a control program in advance. The CPU loads the control program into the RAM and executes it as appropriate, and thereby functioning as the main controller 2. For example, the main controller 2 receives an operation signal from the operation unit 5, and requests for volume data from the image storage device 30. The main controller 2 also controls the display of medical images on the display 4. In addition, having received setting information relating to noise reduction (described later) from the processing order controller 7, the main controller 2 controls the noise reduction for volume data. The control of the main controller 2 is described in detail later.

<Transceiver>

The transceiver 3 is an interface for exchanging volume data with the image acquisition apparatuses 20A, 20B, 20C, or the image storage device 30.

<Display>

The display 4 includes an arbitrary display device such as a cathode ray tube (CRT), a liquid crystal display (LCD), an organic electro-luminescence display (OELD), or a field emission display (FED). The display 4 displays various types of screens and images (X-ray images, etc.) under the control of the main controller 2.

<Operation Unit>

The operation unit 5 includes operation devices and input devices of arbitrary form, such as a keyboard, a mouse, a trackball, a joystick, and a control panel. The operation unit 5 outputs an operation signal based on operation performed thereon, and sends it to the main controller 2. The main controller 2 performs control and operation according to the operation signal.

<Storage>

The storage 6 includes an arbitrary storage medium such as a hard disk drive (HDD) and a solid state drive (SSD). The storage 6 stores analytical software, volume data received from the image storage device 30 and the like, a program for implementing each function of the image processing apparatus 1, and the like. Incidentally, the storage 6 may not necessarily store the volume data, and the volume data may be temporarily stored in the RAM of the main controller 2 or the like.

<Processing Order Controller>

The processing order controller 7 controls the order of noise reduction processing performed by the image processor 8 based on setting information determined in advance. In an example of the embodiment, the processing order controller 7 controls the image processor 8 based on setting information related to the order of noise reduction processing for three orthogonal cross sections in the volume data.

<Image Processor>

Figure 3A:
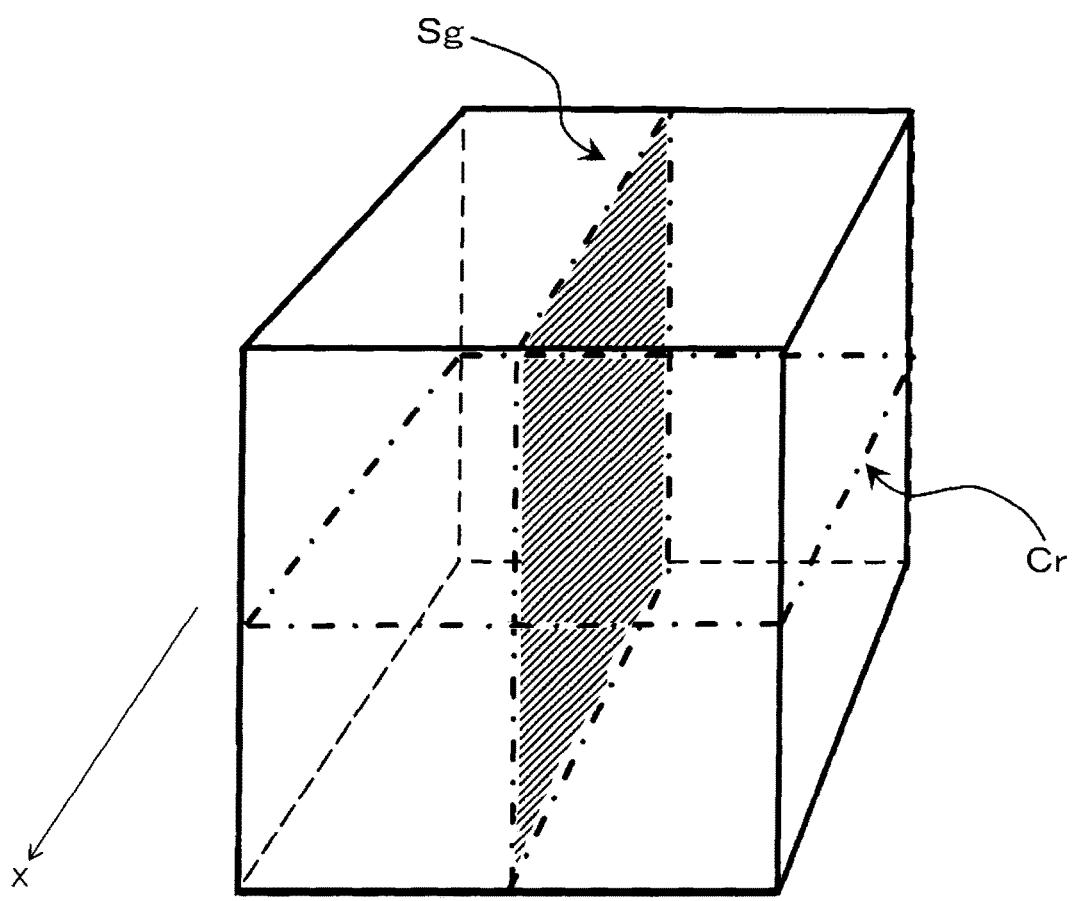
FIG. 3A is a schematic diagram illustrating an example of the order of filtering on volume data.
Figure 3B:
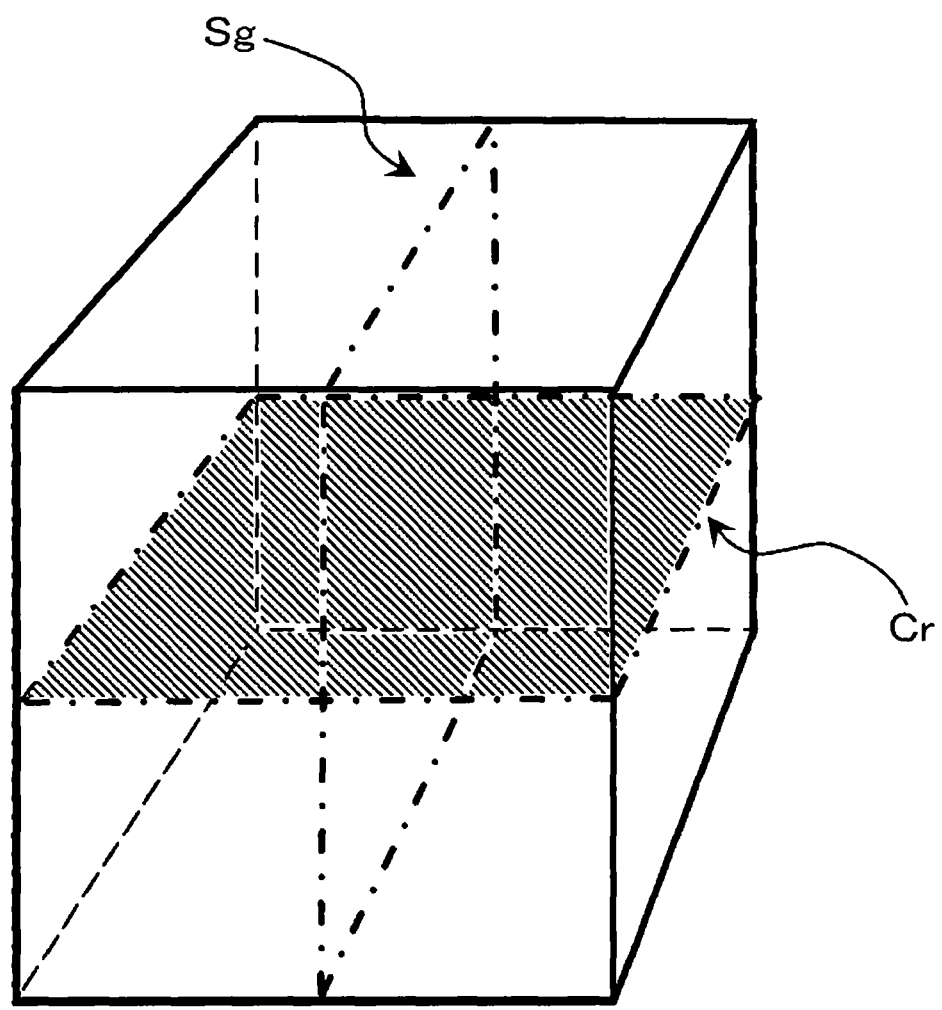
FIG. 3B is a schematic diagram illustrating an example of the order of filtering on volume data.
Figure 3C:
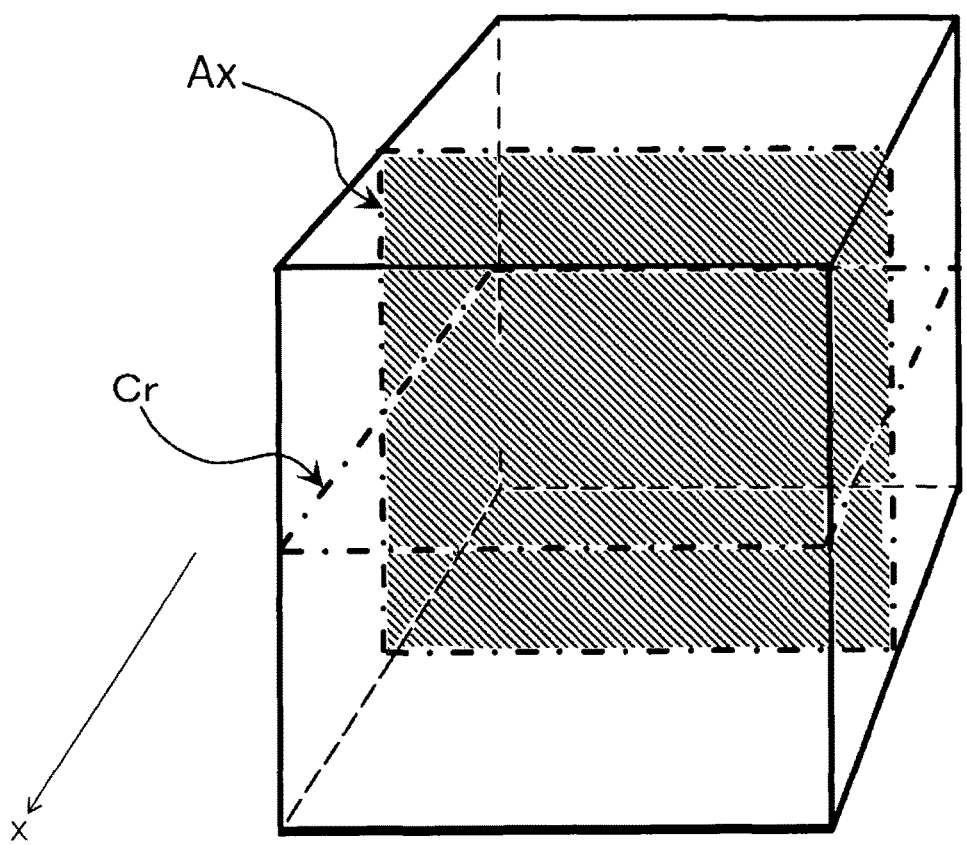
FIG. 3C is a schematic diagram illustrating an example of the order of filtering on volume data.

The image processor 8 applies a coherent filter to, for example, any three orthogonal cross sections of volume data (hereinafter, sometimes referred to as "filtering") according to a control program for performing noise reduction on the volume data or the like. A sequence of the operation is described with reference to FIGS. 2 and 3A to 3C. FIG. 2 is a flowchart of a sequence of noise reduction processing performed by the image processing apparatus 1 of the first embodiment. FIGS. 3A to 3C are schematic diagrams illustrating an example of the order of filtering on volume data. FIG. 3A conceptually illustrates the state of performing coherent filtering of the sagittal plane as the first order filtering. FIG. 3B conceptually illustrates the state of performing coherent filtering of the coronal plane as the second order filtering. FIG. 3C conceptually illustrates the state of performing coherent filtering of the axial plane as the end of the order of filtering.

The image processor 8 corresponds to an example of "processing circuitry". The filtering and coherent filtering corresponds to an example of "noise reduction".

(Operation)

<Step S01>

An operator such as a doctor inputs identification information for identifying volume data and the like using the operation unit 5 of the image processing apparatus 1. Examples of the identification information include image ID, patient ID, and examination ID. The main controller 2 sends the identification information and the like fed from the operation unit 5 to an external device (the image storage device 30, etc.) that stores corresponding volume data through the transceiver 3. Upon receipt of the identification information, the external device such as the image storage device 30 sends the volume data to the image processing apparatus 1. The main controller 2 of the image processing apparatus 1 temporarily stores the volume data in the storage 6 or the like.

<Step S02>

The main controller 2 sends the volume data temporarily stored in S01 to the image processor 8. For example, as illustrated in FIGS. 3A to 3C, the image processor 8 specifies three orthogonal cross sections in the volume data. The image processor 8 specifies the three orthogonal cross sections by, for example, specifying the axial direction or the like in the volume data. The three orthogonal cross sections may be, for example, an axial plane, a coronal plane, and a sagittal plane. In volume data that indicates human tissues, the axial plane is a cross section perpendicular to the body axis direction. The coronal plane is a cross section parallel to the body axis direction and dividing the human body into front (anterior) and back (posterior) portions. The sagittal plane is a cross section dividing the human body into left and right halves, and perpendicular to the axial plane and the coronal plane. Although, in general, the three orthogonal cross sections each include the center position of volume data, their positions may be differently set.

While the image processor 8 specifies the three orthogonal cross sections, the processing order controller 7 retrieves setting information related to the order of noise reduction processing set in advance from the storage 6 or another storage unit (not illustrated). Described below is the setting information related to the order of noise reduction processing. The image processing apparatus 1 of the first embodiment performs noise reduction on three orthogonal cross sections of volume data. The setting information indicates the order to perform noise reduction on the three orthogonal cross sections. The setting information may be appropriately changed depending on the nature of the volume data.

For example, the setting information may be provided with respect to noise reduction processing for the volume data of the human body. Each structure of the human body almost tends to be similar to another adjacent thereto in the body axis direction. In other words, one structure in the body is almost unlikely to be similar to another structure that is adjacent thereto along the body width direction or the body thickness direction (body's front-to-back direction). Accordingly, to perform noise reduction sequentially for three orthogonal cross sections in different directions as in this embodiment, it may be effective to set the order according to the above tendency.

To describe the settings corresponding to the above tendency, it is to be explained whether the axial plane is appropriate as the first cross section to apply noise reduction to. In the axial plane, structures adjacent in the body width or thickness direction are illustrated. As described above, the body has a tendency that the structures adjacent in the body width or thickness direction are not likely to be similar. If noise reduction (coherent filtering, etc.) is applied first to the axial plane having such a tendency, the cross sections in other directions may be smoothed based on pixels that represent dissimilar structures. In this case, edge retention may be degraded.

In addition, the effect of the noise reduction affects the entire voxels. When noise reduction is applied also to the sagittal plane and the coronal plane after the noise reduction for the axial plane, the planes are further smoothed based on pixels of structures where blurring has been caused by the previous smoothing. This leads to the loss of spatial resolution of the entire volume data. As a result, an image based on the volume data is likely to blur.

For example, when an axial image is generated based on volume data to which noise reduction has been applied, image blur may increase. In other words, blurring is likely to occur in the axial plane due to the first noise reduction, and also further blurring may be caused by another noise reduction thereafter. In this case, the axial image significantly demonstrates the effect of smoothing in the noise reduction based on pixels representing dissimilar structures.

On the other hand, the sagittal plane (see FIG. 3A) and the coronal plane (see FIG. 3B) are parallel to the body axis direction, and therefore structures represented by them tend to be similar to each other. For this reason, it is preferable to apply noise reduction to the sagittal plane or the coronal plane before the axial plane. That is, preferably, the setting information related to the order of noise reduction processing (hereinafter, sometimes referred to as "order setting information") is determined such that the axial plane is the last to be treated with noise reduction. Further, the operator can sometimes estimate the state of the sagittal plane or the coronal plane in volume data before the noise reduction. In such a case, it is preferable to identify a cross section to which noise reduction is to be applied first. Accordingly, the image processing apparatus 1 may store screen data to correct the order setting information.

The following can be derived from the above. That is, in medical image data having three or more directions as volume data, there is a tendency that the similarity between pixels along a certain direction (between pixels in a predetermined cross section) is lower than in other directions. When noise reduction is applied to such medical image data with respect to at least two directions, it is preferable to perform first noise reduction of a cross section other than the one in the direction in which the similarity is low. In other words, by performing noise reduction first for the direction in which the similarity of pixels tends to be high, it is possible to reduce the possibility that blur may occur in a cross section in a direction in which noise reduction is performed afterward. In this point of view, the description continues of the operation of the image processing apparatus 1.

The processing order controller 7 sends the setting information to the image processor 8. The image processor 8 determines whether a coordinate transformation is required to rotate the orientation of the current volume data based on the order setting information. That is, in this embodiment, the coordinate position of volume data to which the image processor 8 applies noise reduction is set by a position in the axial plane (see FIG. 3C). Therefore, it is necessary to determine whether or not the volume data needs to be rotated by a coordinate transformation based on the information of the first cross section in the order setting information. Incidentally, the three orthogonal cross sections of the volume data have already been specified by the image processor 8, the orientation of the volume data to be processed is specified.

Having determined that the volume data needs to be rotated, the image processor 8 specifies the rotation direction based on the positional relationship between the axial plane and a cross section in the order setting information, and rotates the volume data by 90° in the direction. The image processor 8 performs, for example, an affine transformation as such coordinate transformation. The affine transformation herein need not necessarily include enlargement/reduction, reflection, and the like. In the example of FIG. 2, the coordinate transformation of the volume data, the sagittal plane is allocated to the position of the axial plane before the noise reduction.

However, the above coordinate transformation can be dispensed with. For example, if the coordinate position of the volume data to which the image processor 8 applies noise reduction can be specified referring to the order setting information and changed, the above coordinate transformation in step S02 is not performed. Instead of step S02, the image processor 8 specifies the coordinate position of the first cross section in the order setting information based on the order setting information.

<Step S03>

Noise reduction (e.g., coherent filter) is applied to the sagittal plane that has been allocated to the coordinate position for the noise reduction in step S02. Described below is the overview of the coherent filter.

With respect to each pixel (pixel of interest) in a cross section to be processed, the image processor 8 obtains the similarity to the neighboring pixels, i.e., whether it is similar to the neighboring pixels, according to settings. The image processor 8 changes the filter coefficient of the coherent filter according to the similarity. For example, as the similarity increases, the image processor 8 makes the filter coefficient larger. In the same manner, as the similarity decreases, the image processor 8 makes the filter coefficient smaller. Incidentally, if the three orthogonal cross sections are formed of 512×512 pixels, a range of 11×11 pixels around the pixel of interest are an example of the neighboring pixels. The following describes the concept of the coherent filter in this example.

The image processor 8 quantifies the matching degree between the pixel value (scalar value or vector value) of each of pixels that constitute the cross section to be processed and that of other pixels (referred to as "neighboring pixels"). The image processor 8 obtains the magnitude of the quantified matching degree between the pixel of interest and the neighboring pixels by using a threshold or by determining which one of a plurality levels of numerical ranges the matching degree belongs to. The image processor 8 uses the pixel values of the neighboring pixels as the pixel value of the pixel of interest. If the matching degree is high, the image processor 8 increases the contribution of the neighboring pixels. Similarly, if the matching degree is low, the image processor 8 reduces the contribution of the neighboring pixels.

For a specific example, the image processor 8 applies a weighting function, which is a function of the matching degree between the pixel of interest and the neighboring pixels, to the matching degree obtained for each of the pixel values of the neighboring pixels. Then, the image processor 8 determines the weight of the pixel value of each neighboring pixel. The image processor 8 also calculates the weighted average of the pixel values for the neighboring pixels using the weights. Thus, when the matching degree between the pixel of interest and the neighboring pixels is high, the image processor 8 increases the weight of the neighboring pixels. In this manner, the image processor 8 increases the contribution of the pixel values of the neighboring pixels in the weighted average to thereby determine the pixel value of the pixel of interest. Similarly, if the matching degree is low, the image processor 8 reduces the contribution of the pixel values of the neighboring pixels in the weighted average by reducing the weight to thereby determine the pixel value of the pixel of interest. With this, the pixel value is determined for the pixel of interest with an emphasis on the neighboring pixels that have been determined to be "similar" to the pixel of interest. As a result, the loss of spatial resolution can be prevented with reducing noise level by contribution of neighboring pixels which have similar structure. The weighting function may be a non-negative monotonically increasing function related to the matching degree.

<Step S04>

Based on the positional relationship between the next cross section in the order setting information and the coordinate position for the noise reduction, the image processor 8 specifies the rotation direction, and rotates the volume data by 90° in the direction. In the example of FIG. 2, by the second coordinate transformation of the volume data, the coronal plane is allocated to the position of the sagittal plane before the noise reduction.

However, if the coordinate position of the volume data to which the image processor 8 applies noise reduction can be specified referring to the order setting information and changed, the above coordinate transformation in step S04 is not performed. Instead of step S04, the image processor 8 specifies the coordinate position of the second cross section in the order setting information based on the order setting information.

<Step S05>

Noise reduction (e.g., coherent filter) is applied to the coronal plane that has been allocated to the coordinate position for the noise reduction in step S04. The same coherent filter as in step S03 is used here.

<Step S06>

Based on the positional relationship between the next Cross section in the order setting information and the coordinate position for the noise reduction, the image processor 8 specifies the rotation direction, and rotates the volume data by 90° in the direction. In the example of FIG. 2, by the last coordinate transformation of the volume data, the axial plane is allocated to the position of the coronal plane before the noise reduction.

<Step S07>

Noise reduction (e.g., coherent filter) is applied to the axial plane that has been allocated to the coordinate position for the noise reduction in step S06. The same coherent filter as in step S03 is used here.

Note that, while noise reduction is described above as being performed for the sagittal plane, the coronal plane, and the axial planes in this order, it may also be performed in the order of the coronal plane, the sagittal plane, and the axial plane. Nevertheless, it is preferable that noise reduction be performed in the order of the sagittal plane, the coronal plane, and the axial plane to understand the intracranial structure.

At the time of data collection for generating volume data (at the time of imaging, etc.), the data may be collected while the body axis of the subject is tilted. In this case, a plane with an angle closest to the actual axial plane is regarded as the axial plane, and then the process may be performed in the same manner as above.

Further, it is not necessary to perform filtering for all the three orthogonal cross sections. With the last filtering on the axial planes, the effect of noise reduction may not be high. Besides, when a focus is placed on the lower contrast than noise such as white matter and gray matter of the brain parenchyma, it is difficult to distinguish between weak contrast and noise. However, even if the weighted average is applied to the sagittal plane and the coronal plane ignoring weak contrast, no problem arises in filtering because the similar structures are adjacent to one another. On the other hand, in the axial plane, filtering works in the direction of suppressing weak contrast. In such a case, it is preferable not to perform the process in the axial direction.

In addition, while the coherent filter is described above as an example, a diffusion filter (anisotropic diffusion) may also be used. As the diffusion filter, adaptively weighted anisotropic diffusion (AWAD) may be employed. AWAD is effective in reducing noise as well as maintaining the structure of relevant biological tissues in various sizes or the edge of the periphery of the structure.

According to the embodiment, the image processing apparatus 1 is configured to reduce noise in volume data by applying noise reduction to the three orthogonal cross sections. This reduces the amount of processing as compared to the configuration in which noise reduction is performed three-dimensionally for each voxel of volume data. As a result, it is possible to reduce the time it takes to perform noise reduction for volume data.

Further, as compared to the configuration in which noise reduction is performed two-dimensionally a plurality of times on a predetermined cross section to reduce noise in volume data, edge blur is prevented in the image of the cross section. As a result, it is possible to suppress the reduction of the spatial resolution of the volume data. Further, unlike the configuration in which noise reduction is performed two-dimensionally a plurality of times on a predetermined cross section, noise reduction applied to a predetermined cross section does not conform to another cross section perpendicular to the cross section. Thus, it is possible to suppress the reduction of spatial resolution in the other cross section.

In the image processing apparatus 1 of the embodiment, the order in which noise reduction is applied to the three orthogonal cross sections is set in advance. In addition, in the processing order controller 7, the order is set such that the last noise reduction is performed on the axial plane for volume data based on data acquired from the human body as a subject.

With this configuration, it is possible to suppress the reduction of the spatial resolution of the entire volume data due to smoothing between pixels that represent dissimilar structures.

Second Embodiment

Figure 4:
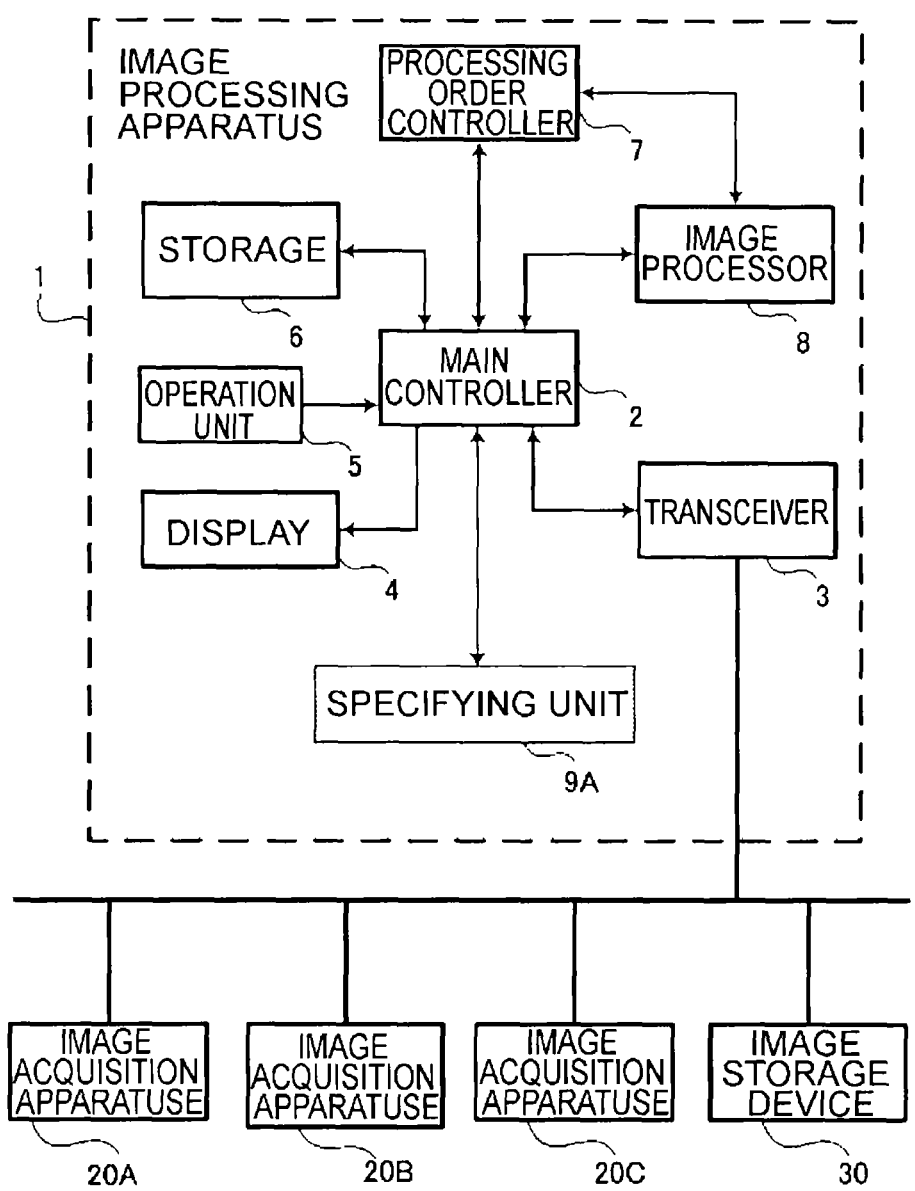
FIG. 4 is a schematic block diagram of an image processing apparatus according to a second embodiment.
Figure 5:
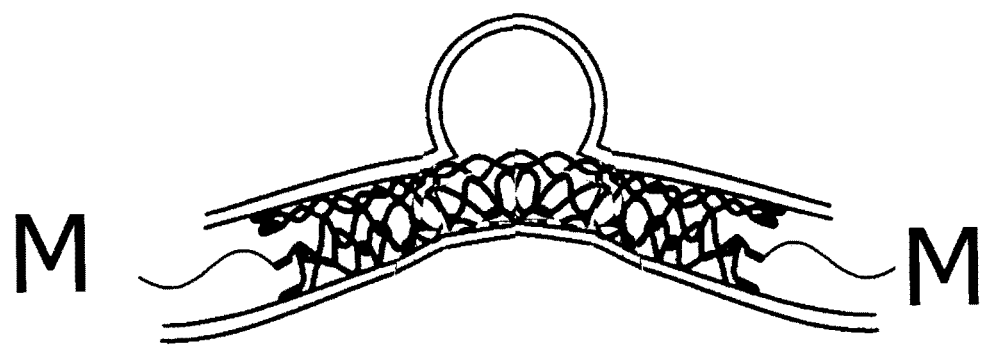
FIG. 5 is a schematic diagram illustrating an example of a blood vessel having an aneurysm and a stent and its markers placed in the blood vessel.

With reference to FIGS. 4 and 5, a description is given of the image processing apparatus 1 according to the second embodiment. FIG. 4 is a schematic block diagram of an example of the image processing apparatus 1 of the second embodiment. FIG. 5 is a schematic diagram illustrating an example of a blood vessel having an aneurysm and a stent and its markers M placed in the blood vessel. In the first embodiment, the axial plane is placed last in the order of noise reduction processing for volume data of the human body. On the other hand, according to the second embodiment, a plurality of predetermined feature points such as stent markers M are extracted from the volume data, and the axial plane, the coronal plane or the sagittal plane that is closest to a cross section including the feature points is specified. The order of noise reduction processing is set such that the last noise reduction is performed on the axial plane, the coronal plane or the sagittal plane specified.

As illustrated in FIG. 4, the image processing apparatus 1 of the second embodiment includes the main controller 2, the transceiver 3, the display 4, the operation unit 5, the storage 6, the processing order controller 7, the image processor 8, and a specifying unit 9A. The main controller 2, the transceiver 3, the display 4, the operation unit 5, and the storage 6 are the same as those in the first embodiment.

(Specifying Unit)

The specifying unit 9A of the second embodiment is described below. Volume data indicating the state of the internal tissues of the subject may contain a characteristic tissue or a characteristic structure related to the tissue. The specifying unit 9A obtains the coordinate position (hereinafter, referred to as "feature point") of the structure in the volume data. If there is more than one feature point, the specifying unit 9A specifies a cross section that represents the inclination of each feature point. The specifying unit 9A also specifies the feature points by using feature point setting information. Described below is the feature point setting information. The cross section that represents the inclination of each feature point is obtained as a plane that is estimated to be the closest cross section to two or more feature points contained in the volume data. In the following, this surface may be sometimes referred to as "specific plane".

<Feature Point Setting Information>

The storage unit (not illustrated) or the like of the image processing apparatus 1 stores a structure that can be a feature point in volume data and a pixel value that the structure indicates in association with each other. In the following, this information is referred to as "feature point setting information". As an example of the feature point setting information may be cited stent markers M (X-ray opaque metal, etc.) having predetermined properties. A stent may be included in the inside of the object indicated by the volume data. For example, four stent markers M are provided to both ends of the stent used in the interventional therapy.

In the method of collecting information on the tissues of an object for a medical image (X-ray, ultrasound, nuclear magnetic resonance, etc.), a structure having a predetermined property (X-ray opaque, etc.) such as the stent marker M indicates a predetermined pixel value in a medical image.

Accordingly, to specify a feature point, in the feature point setting information, the type of a structure that the object normally has or the type of a structure (the stent marker M of the stent, etc.) that is inserted in the object (a blood vessel, etc.) is associated with structure data corresponding to the type of the structure. The structure data is information on the volume, shape, and the like of a structure in medical image data and the pixel value of a pixel representing the structure. Alternatively, in the feature point setting information, the specified type of the structure may be associated with a numerical range of the typical pixel values of the pixel representing the structure.

From the volume data, the specifying unit 9A detects whether there is a voxel corresponding to the pixel value of one of various structures registered in the feature point setting information. With reference to the volume, shape, and the like of an extracted structure, structures similar in pixel value such as, for example, a coil inserted in the aneurysm, a metal filling in a tooth, and the like are removed from the candidates. As a result of the detection, if a plurality of structures are registered in the feature point setting information, the specifying unit 9A stores the coordinate position of each of the structures. Further, the specifying unit 9A determines, as a specific plane, a cross section where the average of distances from the coordinate positions of the same (or the same type of) structures thus stored is minimum.

In this manner, the specifying unit 9A obtains the cross section that is estimated to be the closest to each group of feature points as a specific plane.

For example, assuming that there are four stent markers M, and the coordinate of each of them are $(X_i, Y_i, Z_i)$ (i=1 to 4), the cross section can be represented by the following formula (2):

[Formula 2]

$$(ax_i + by_i + cz_i + d) = 0 \qquad (2)$$

According to this, the cross section that is estimated to be the closest to each group of feature points, i.e., the specific plane, can be obtained by minimizing the following formula (3):

[Formula 3]

$$E = \sum_{x=1}^{4} (ax_i + by_i + cz_i + d) \qquad (3)$$

As with a stent marker M at one end of a stent and a stent marker M at the other end, feature points may be detected at positions distant from each other. If, like this case, the coordinates of feature points are distant from each other by a predetermined distance or more in volume data, the specifying unit 9A may be configured to remove the feature points. Besides, if, for example, there are four feature points on one end in the longitudinal direction of a certain structure, and also one or more feature points are located on the other end of the structure away from each of the feature points, the specifying unit 9A removes the feature points based on the coordinates of the feature points, and obtains a cross section by using only feature points located close to each other.

<Specify Cross Section>

The specifying unit 9A specifies the axial plane, the coronal plane, or the sagittal plane with the closest angle to the cross section specified. To specify one of these planes, for example, the specifying unit 9A calculates the inner product of the unit normal vector of the cross section and that of each of the axial plane, the coronal plane, and the sagittal plane. The specifying unit 9A determines the ascending order of the inner products.

For another example, instead of the inner product, the specifying unit 9A may calculate an angle between the cross section and each of the axial plane, the coronal plane, and the sagittal plane. In this case, the specifying unit 9A determines the descending order of the angles. An acute angle is selected for each of the angles.

For still another example, the specifying unit 9A may not be configured to obtain the closest cross section to each of the feature points. For example, based on the coordinate positions of each group of feature points, the specifying unit 9A may specify a plane (the axial plane, the coronal plane, or the sagittal plane) with the largest variance of distances from the feature points in order.

In this manner, the specifying unit 9A sets the order of noise reduction processing for cross sections in different directions (the axial plane, the coronal plane, and the sagittal plane, etc.). In this embodiment, the order setting information is changed in the processing order controller 7.

Further, the specifying unit 9A may be configured to specify morphological feature points by the analysis of the shape of each structure in volume data such as pattern recognition or the like rather than pixel values. This configuration is described later as a modification.

(Operation)

Figure 6:
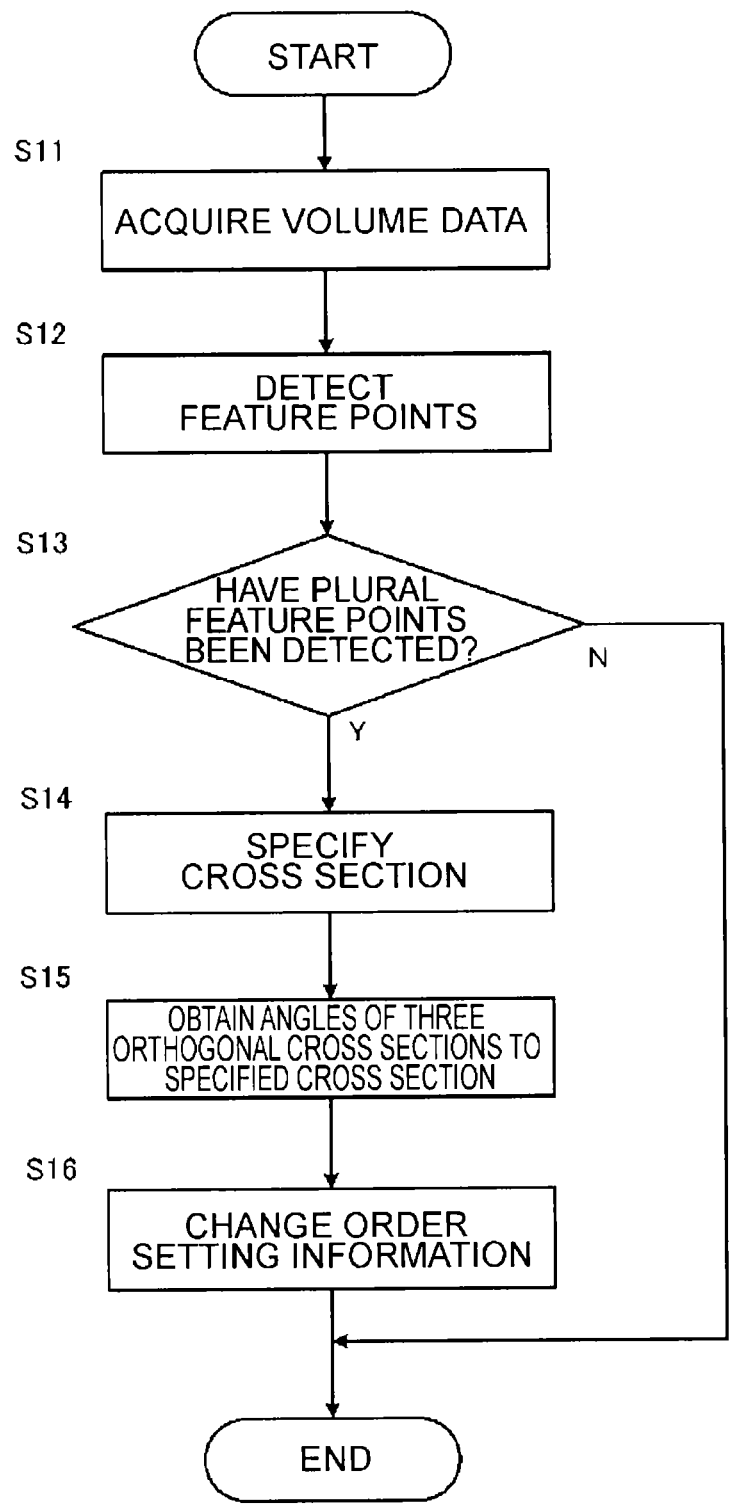
FIG. 6 is a flowchart of a sequence of the operation of the image processing apparatus of the second embodiment.

Next, a description is given of the operation of the image processing apparatus 1 of the second embodiment with reference to FIG. 6. FIG. 6 is a flowchart of a sequence of the operation of the image processing apparatus 1 of the second embodiment.

<Step S11>

An operator such as a doctor inputs identification information for identifying volume data using the operation unit 5 of the image processing apparatus 1. Examples of the identification information include image ID, patient ID, and examination ID. The main controller 2 sends the identification information and the like fed from the operation unit 5 to an external device (the image storage device 30, etc.) that stores corresponding volume data through the transceiver 3. Upon receipt of the identification information, the external device such as the image storage device 30 sends the volume data to the image processing apparatus 1. The main controller 2 of the image processing apparatus 1 temporarily stores the volume data in the storage 6 or the like.

<Step S12>

The main controller 2 sends the volume data temporarily stored in step S11 to the specifying unit 9A. From the volume data, the specifying unit 9A detects a voxel corresponding to the pixel value of each type of structure registered in the feature point setting information.

<Step S13>

The specifying unit 9A determines whether a plurality of feature points have been detected by the detection. The feature point is a structure corresponding to the pixel value or the like of one of various structures registered in the feature point setting information.

<Step S14>

Having determined that there is a plurality of feature points in step S13, the specifying unit 9A stores the coordinate positions of the feature points in the storage 6. The specifying unit 9A also specifies, for example, a cross section (specific plane) that is estimated to be the closest to each of the coordinate positions.

<Step S15>

The specifying unit 9A obtains the inclination of the axial plane, the coronal plane, and the sagittal plane with respect to the cross section specified in S14. Of the three orthogonal cross sections, the specifying unit 9A determines the descending order of the inclinations with respect to the specific plane. In other words, the specifying unit 9A determines the farthest plane from the specific plane among the three orthogonal cross sections.

<Step S16>

Based on the descending order of the inclinations determined in step S15, the specifying unit 9A changes the order of noise reduction processing in the order setting information. For example, noise reduction is performed in the descending order of the inclinations.

As in the first embodiment, the image processing apparatus 1 of the embodiment is configured to apply noise reduction to the three orthogonal cross sections in volume data. This reduces the amount of processing, thus enabling the reduction of the time it takes to perform noise reduction. Besides, edge blur is prevented in the image of the cross section. In addition, according to the embodiment, among the three different directions in medical image data, when noise reduction is applied with respect to at least two directions, it is possible to prevent noise reduction applied to one cross section in a direction from reducing the spatial resolution of the other cross section. For example, when noise reduction is performed on one of the three orthogonal cross sections (e.g., the axial plane) the closest to the cross section (specific plane) that represents the slope of feature points for the first time, the noise reduction affects the entire volume data, which may cause a reduction in the spatial resolution of a cross section (e.g., the sagittal plane or the coronal plane) perpendicular to the cross section subjected to the process. In this respect, according to the embodiment, it is possible to suppress the reduction of the spatial resolution with the above configuration.

Figure 7:
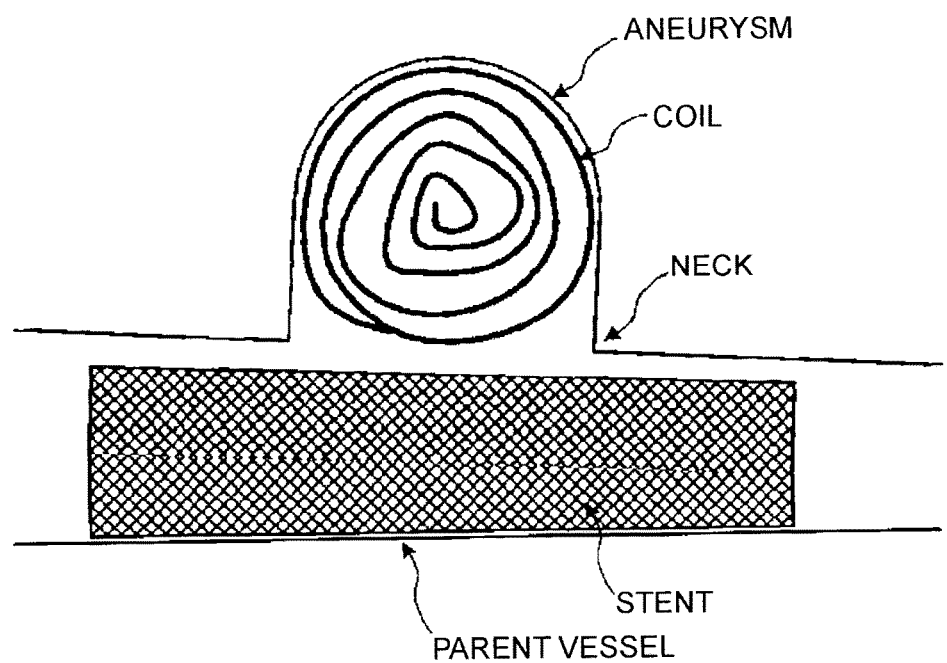
FIG. 7 is a schematic diagram illustrating an example of a blood vessel having an aneurysm and stents and their markers placed in the blood vessel.

As illustrated in FIG. 7, if a gap between the stent and the blood vessel is increased, a blood clot may be caused by the coagulation of the blood. Therefore, it is necessary that whether the stent is well spread with respect to the blood vessel is prehensible from an image. However, if the stent strut is blurred due to noise reduction, it is difficult for the user to grasp the relationship between the stent and the blood vessel wall. In a cross section perpendicular to the longitudinal axis, pixels of the stent are not likely to be similar. Accordingly, if noise reduction is applied first to the cross section perpendicular to the longitudinal axis, the stent strut is blurred in the image.

In this regard, according to the second embodiment, the image processing apparatus 1 detects feature points from volume data, and sets the order of noise reduction processing such that noise reduction is applied to the three orthogonal cross sections in the descending order of their inclinations to a plane including the feature points. In this manner, noise reduction is performed on the cross sections in the order in which the strut is less likely to be blurred. Thus, it is possible to further reduce the blurring of the strut in the final processed image.

(Modification)

Described below is a modification of the second embodiment. As described above, the specifying unit 9A is configured to detect feature points of volume data based on the pixel values. However, the specifying unit 9A may be configured to specify morphological feature points by the analysis of the shape of each structure in volume data.

For example, the specifying unit 9A performs pattern recognition of each part indicated in volume data. In this example, as the feature point setting information, a plurality of patterns in the form of each structure of the object are registered in the image processing apparatus 1. From the volume data, the specifying unit 9A extracts a voxel group with the same or corresponding pixel values in a predetermined region from among voxels adjacent to each other. Incidentally, the term "corresponding pixel values" indicates that the difference between the pixel values of the voxels is within a predetermined numerical range. The specifying unit 9A compares the extracted result with a registered pattern. The specifying unit 9A detects a structure that correlates with the registered pattern from the volume data. Thereby, the specifying unit 9A specifies feature points in the volume data, and stores the coordinates of the voxels.

In the detection, the specifying unit 9A obtains the similarity, correlation, match rate, and the like between the voxel group in the predetermined region of the volume data and a specific structure pattern registered in advance as the feature point setting information. As a result of the pattern recognition, if the similarity between the voxel group and the specific structure pattern is or exceeds a predetermined value, the specifying unit 9A determines the voxel group in the predetermined region of the volume data as feature points.

Third Embodiment

Figure 8:
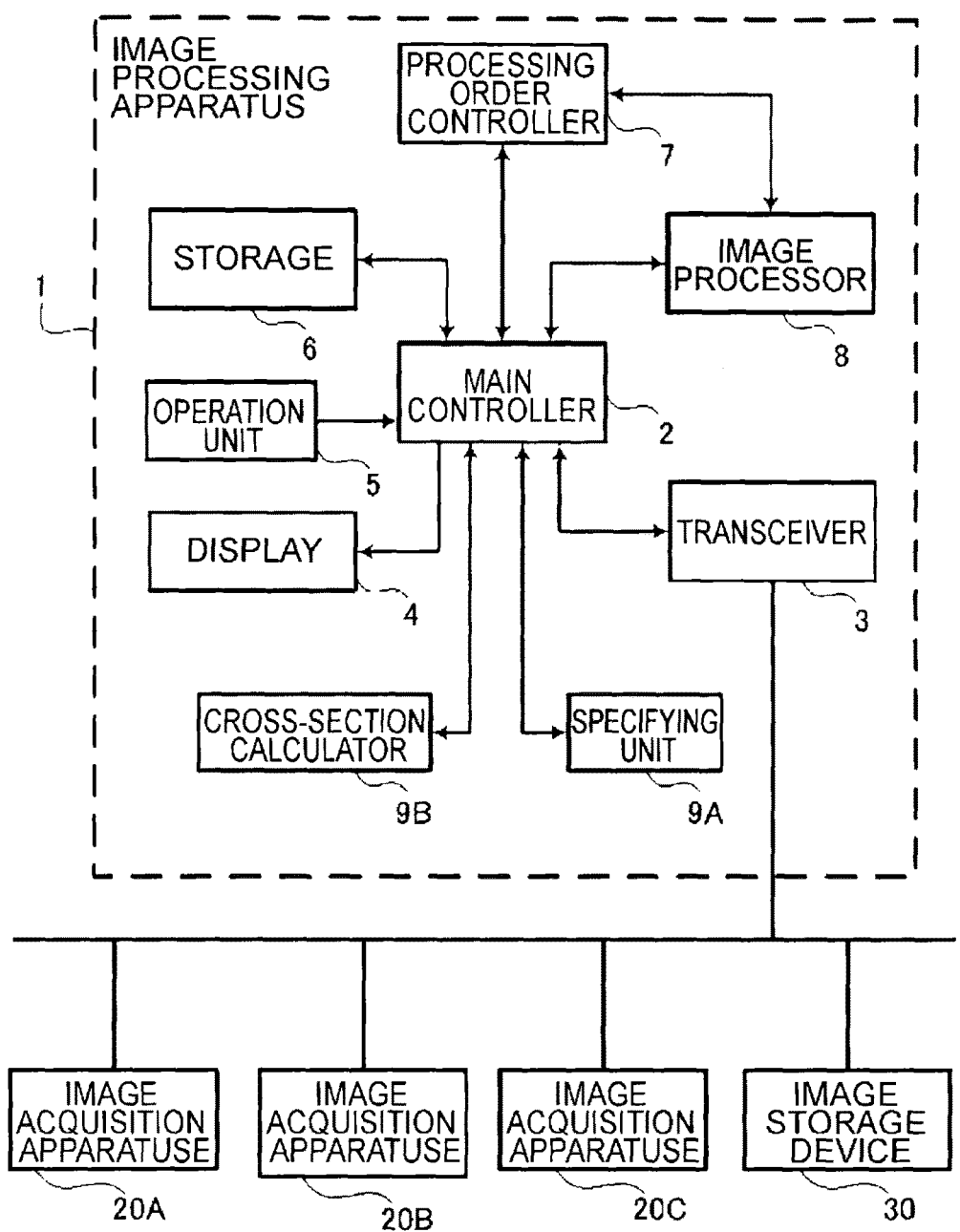
FIG. 8 is a schematic block diagram of an image processing apparatus according to a third embodiment.
Figure 9:
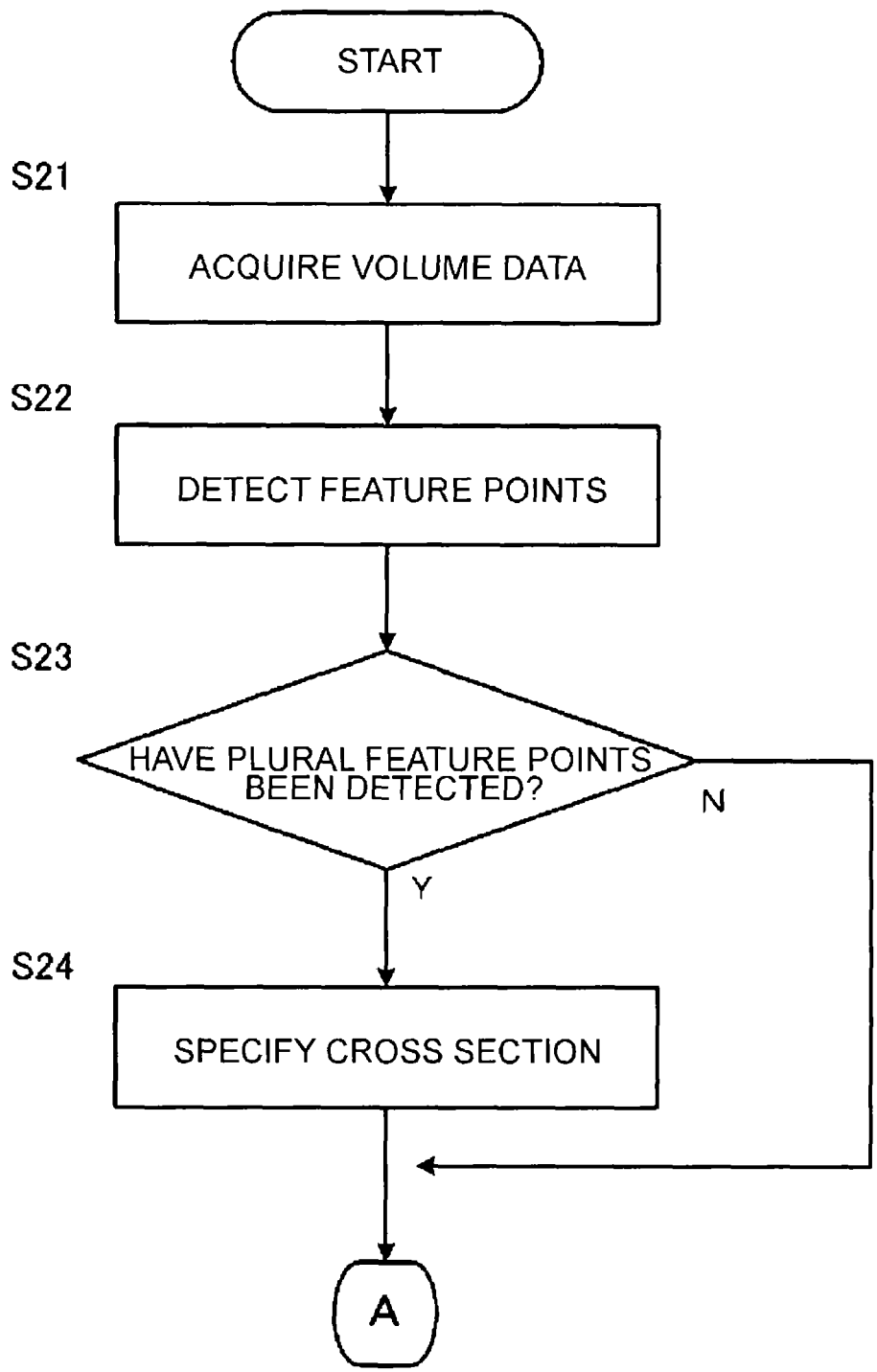
FIG. 9 is a flowchart of a sequence of the operation of the image processing apparatus of the third embodiment.

With reference to FIGS. 8 and 9, a description is given of the image processing apparatus 1 according to the third embodiment. FIG. 8 is a schematic block diagram of an example of the image processing apparatus 1 of the third embodiment. In the second embodiment, the specifying unit 9A is configured to determine the specific plane that is the closest to each feature point, and calculate the angle between the specific plane and the axial plane, the coronal plane, or the sagittal plane. In addition, the specifying unit 9A changes the order setting information according to the descending order of the angles to change the order of noise reduction processing for the three orthogonal cross sections. On the other hand, according to the third embodiment, after the specifying unit 9A has determined the specific plane, a cross-section calculator 9B determines two cross sections perpendicular to the specific plane based on the coordinate positions.

As illustrated in FIG. 8, the image processing apparatus 1 of the third embodiment includes the main controller 2, the transceiver 3, the display 4, the operation unit 5, the storage 6, the processing order controller 7, the image processor 8, the specifying unit 9A, and the cross-section calculator 9B. The main controller 2, the transceiver 3, the display 4, the operation unit 5, and the storage 6 are the same as those in the first embodiment. In the following, the third embodiment is described mainly about the cross-section calculator 9B.

(Specifying Unit)

The specifying unit 9A determines a specific plane as in the second embodiment. Then, in the third embodiment, the specifying unit 9A obtains information to define the specific plane. This information is, for example, coordinates or the like indicating the range of the specific plane. The specifying unit 9A feeds the cross-section calculator 9B with the information to define the specific plane. Here, for example, coordinate information is sent to the cross-section calculator 9B. The coordinate information may be any information as well as it can define the specific plane. Examples of the coordinate information include the coordinates of a voxel in each end (corner) of the cross section, the coordinates of voxels in two different points in the cross section, the coordinates of at least one side of the cross section, the coordinates of the outer edge of the specific plane, and the like.

(Cross-Section Calculator)

Upon receipt of the information to define the specific plane from the specifying unit 9A, the cross-section calculator 9B obtains the specific plane from the coordinates, and also obtains three orthogonal cross sections including the specific plane as one of them. For example, the cross-section calculator 9B determines the center position in the specific plane. The cross-section calculator 9B then determines two cross sections including a voxel in the center position of the specific plane, and perpendicular to each other as well as perpendicular to the specific plane. If perpendicular to the specific plane and perpendicular to each other, the two cross sections need not necessarily include the voxel in the center position of the specific plane. As there is a plurality of orthogonal cross sections, one of them may be identified based on, for example, one of the positions of structures.

The cross-section calculator 9B sends the coordinate information of the three orthogonal cross sections obtained to the image processor 8 via the main controller 2. In addition, the cross-section calculator 9B changes the order setting information in the processing order controller 7. The order setting information is changed such that noise reduction for the specific plane is set to be the last. The cross-section calculator 9B changes the order setting information in the processing order controller 7 as for the cross section for performing the first noise reduction. In the third embodiment, the processing order is associated with the information to define the specific plane specified by the coordinates and stored in the order setting information.

(Image Processor)

As in other embodiments, the image processor 8 receives the order setting information from the processing order controller 7, and determines the cross section specified by the coordinates and its order based on the setting information. Thus, noise reduction processing is started.

(Operation)

Next, a description is given of the operation of the image processing apparatus 1 of the third embodiment with reference to FIGS. 9 and 10. FIGS. 9 and 10 are flowcharts illustrating a sequence of the operation of the image processing apparatus 1 of the third embodiment.

<Step S21>

An operator such as a doctor inputs identification information for identifying volume data using the operation unit 5 of the image processing apparatus 1. Examples of the identification information include image ID, patient ID, and examination ID. The main controller 2 sends the identification information and the like fed from the operation unit 5 to an external device (the image storage device 30, etc.) that stores corresponding volume data through the transceiver 3. Upon receipt of the identification information, the external device such as the image storage device 30 sends the volume data to the image processing apparatus 1. The main controller 2 of the image processing apparatus 1 temporarily stores the volume data in the storage 6 or the like.

<Step S22>

The main controller 2 sends the volume data temporarily stored in step S21 to the specifying unit 9A. From each voxel of the volume data, the specifying unit 9A detects a voxel corresponding to the pixel value of each type of structure registered in the feature point setting information.

<Step S23>

The specifying unit 9A determines whether it has detected a plurality of voxels (feature points) corresponding to the pixel value of any of various structures registered in the feature point setting information.

<Step S24>

When the specifying unit 9A determines that there is a plurality of voxels (feature points) corresponding to the pixel value of the feature point setting information in step S23, the coordinate position of the voxels is stored as the coordinate position of the feature points. The specifying unit 9A also obtains the closest cross section to the coordinate position as a specific plane.

<Step S25>

The cross-section calculator 9B determines the specific plane specified in step S24, and two cross sections including a voxel in the center position of the specific plane, and perpendicular to each other as well as perpendicular to the specific plane.

<Step S26>

The cross-section calculator 9B changes the order setting information in the processing order controller 7 such that noise reduction for the specific plane specified in step S24 is to be performed last.

<Step S27>

The image processor 8 starts noise reduction based on the order setting information. Of the three orthogonal cross sections specified by the cross-section calculator 9B, the cross section specified in step S24 is the last one treated with noise reduction.

(Modification)

In the third embodiment described above, the image processing apparatus identifies the orientation of the stent, and determines arbitrary three orthogonal cross sections to apply noise reduction to suppress the blurring of the strut. However, it is not so limited. For example, the image processing apparatus may include a unit for identifying three orthogonal cross sections appropriately for a head medical image such as a head X-ray CT image. Specifically, by recognizing the ear that is a overhang structure and the eye socket that is the largest hole in the skull structure, the specifying unit 9A identifies a plane to be the axial plane. The specifying unit 9A then specifies the sagittal plane as a plane that passes through the midpoint of the two eye sockets as well as the midpoint of the two ears, and is perpendicular to the plane identified. Further, the specifying unit 9A may identify the coronal plane as a plane that is perpendicular to the axial plane and the sagittal plane. With this configuration, even when it is difficult to orient a patient in the front direction due to the state of the patient, the axial plane, the coronal plane, and the sagittal plane are identified from an image. Thus, noise reduction can be applied to the sagittal plane, the coronal plane, and the axial plane in this appropriate order.

In the third embodiment, there are cases where the well-known three orthogonal cross sections and three orthogonal cross sections of volume data do not coincide. In this case, the volume data may be rotated so that the identified three orthogonal cross sections coincide with the three orthogonal cross sections of the volume data. Alternatively, re-reconstitution may be performed so that the identified three orthogonal cross sections coincide with the three orthogonal cross sections of the volume data.

As in the first embodiment, the image processing apparatus 1 of the embodiment is configured to apply noise reduction to the three orthogonal cross sections in volume data. This reduces the amount of processing, thus enabling the reduction of the time it takes to perform noise reduction. Besides, the blurring of an edge of a structure of interest is prevented in the cross section. When noise reduction is performed on the cross section that represents the slope of feature points for the first time, the noise reduction affects the entire volume data, which may cause a reduction in the spatial resolution of a cross section perpendicular to the cross section subjected to the process. In this respect, according to the embodiment, it is possible to suppress the reduction of the spatial resolution with the above configuration.

According to the third embodiment, the image processing apparatus 1 detects a plurality of feature points from volume data, and obtains a specific plane. Further, the image processing apparatus 1 specifies three orthogonal cross sections including the specific plane. The specific plane of the three orthogonal cross sections is placed last in the order of noise reduction processing. Accordingly, the last smoothing is performed on a cross section having feature points of stent markers. Thus, it is possible to suppress the blurring of the strut in the noise reduction processing.

Fourth Embodiment

Figure 12A:
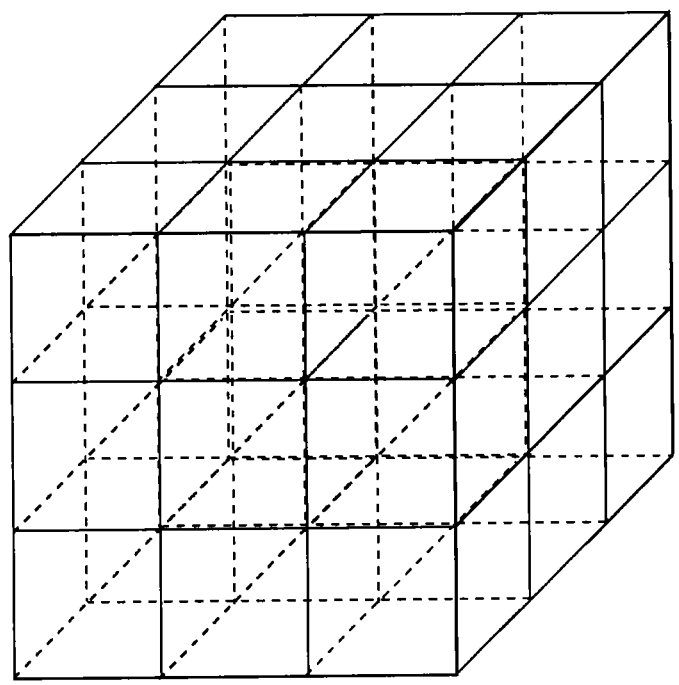
FIG. 12A is a conceptual diagram of a range of neighboring pixels.
Figure 12B:
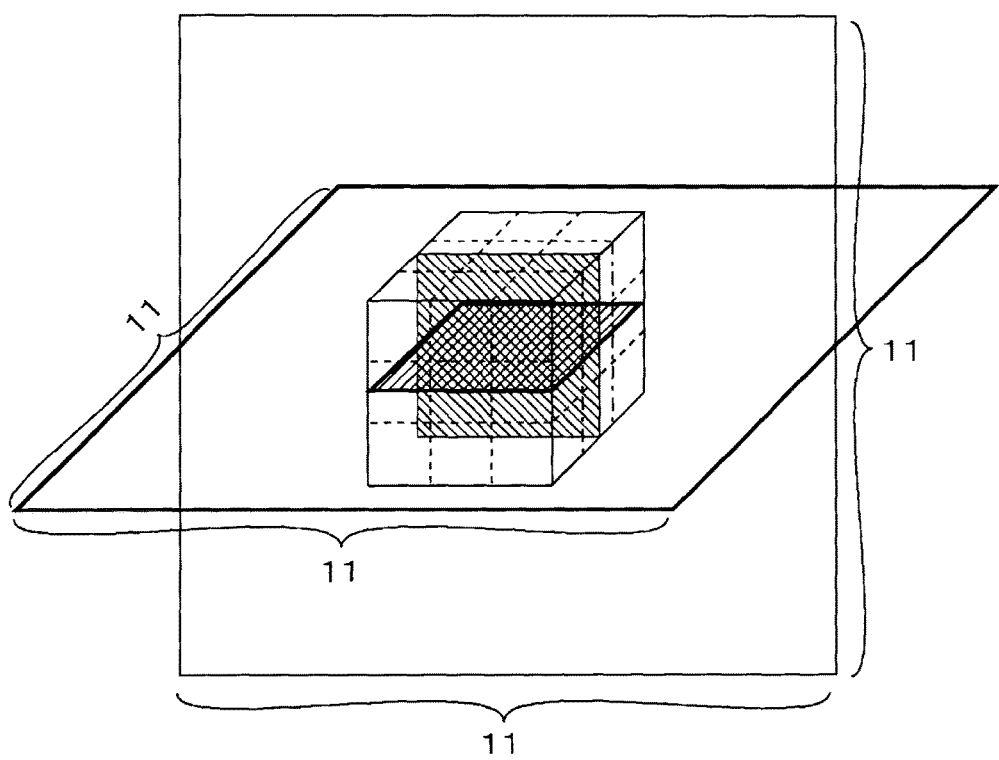
FIG. 12B is a conceptual diagram of a range of neighboring pixels.

With reference to FIGS. 11 and 12, a description is given of the image processing apparatus 1 according to the fourth embodiment. FIG. 11 is a flowchart of a sequence of the operation of the image processing apparatus 1 of the fourth embodiment. FIGS. 12A and 12B are schematic diagrams illustrating a concept of a range of neighboring pixels. The fourth embodiment includes a part common to each of the first to third embodiments, only the differences between the fourth embodiment and the above embodiments are described below. Note that underlying part is described based on the first embodiment.

<Step S31>

An operator such as a doctor inputs identification information for identifying volume data using the operation unit 5 of the image processing apparatus 1. Examples of the identification information include image ID, patient ID, and examination ID. The main controller 2 sends the identification information and the like fed from the operation unit 5 to an external device (the image storage device 30, etc.) that stores corresponding volume data through the transceiver 3. Upon receipt of the identification information, the external device such as the image storage device 30 sends the volume data to the image processing apparatus 1. The main controller 2 of the image processing apparatus 1 temporarily stores the volume data in the storage 6 or the like.

<Step S32>

The image processor 8 sets a range of 11×11 pixels (see FIG. 12B) in the coronal plane and the sagittal plane in the volume data as neighboring pixels to determine the similarity. Next, the image processor 8 obtains the similarity between the neighboring pixels and a region of 3×3×3 voxels (see FIG. 12A). The image processor 8 adjusts the weight to be added based on the similarity, and performs processing on the coronal plane and the sagittal plane at once by adding neighboring pixels based on the weight.

<Step S33>

After the noise reduction in step S32, the image processor 8 performs noise reduction on the axial plane.

As in the first embodiment, the image processing apparatus 1 of the embodiment is configured to apply noise reduction to the three orthogonal cross sections in volume data. This reduces the amount of processing, thus enabling the reduction of the time it takes to perform noise reduction. Besides, the blurring of an edge of an image is prevented in the cross section.

In the fourth embodiment, the image processing apparatus 1 performs noise reduction on the region of the combination of the coronal cross section and the sagittal cross section, and then performs noise reduction on the axial cross section. Accordingly, filtering can be performed for the coronal cross section and the sagittal cross section at a time. Thus, the amount of calculation is reduced, resulting in less processing time.

In the fourth embodiment, the axial cross section, the coronal cross section, and the sagittal cross section are described by way of example. If this is applied to the third embodiment, they are replaced by the specific plane and two orthogonal cross sections.

The specifying unit 9A corresponds to an example of "feature point calculator". The first to fourth embodiments may be combined as appropriate. Besides, while the image processing apparatus 1 has been described as being connected via a network to the image acquisition apparatus 20A or the like, it may be an external device that is located in the periphery of the image acquisition apparatuses 20A, 20B, 20C, or the like. Further, the image processing apparatus 1 may be a part of the image acquisition apparatus 20A, 20B, 20C, or the like.

Fifth Embodiment

Figure 13A:
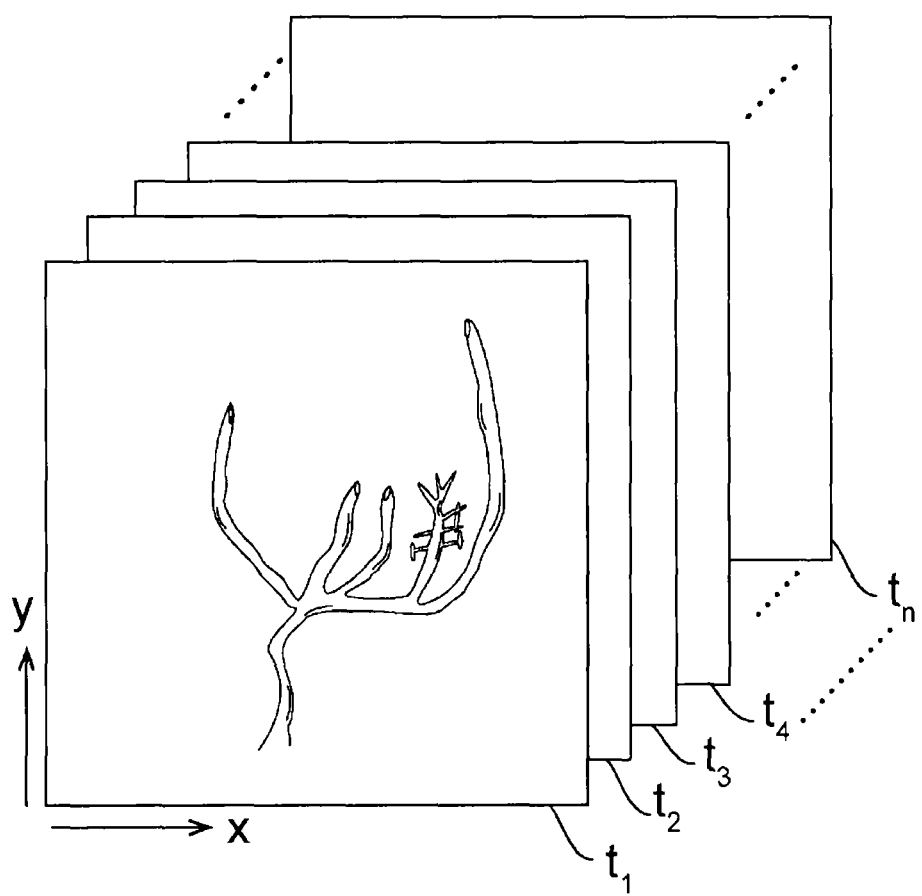
FIG. 13A is a schematic diagram illustrating a relationship among frames acquired over time.
Figure 13B:
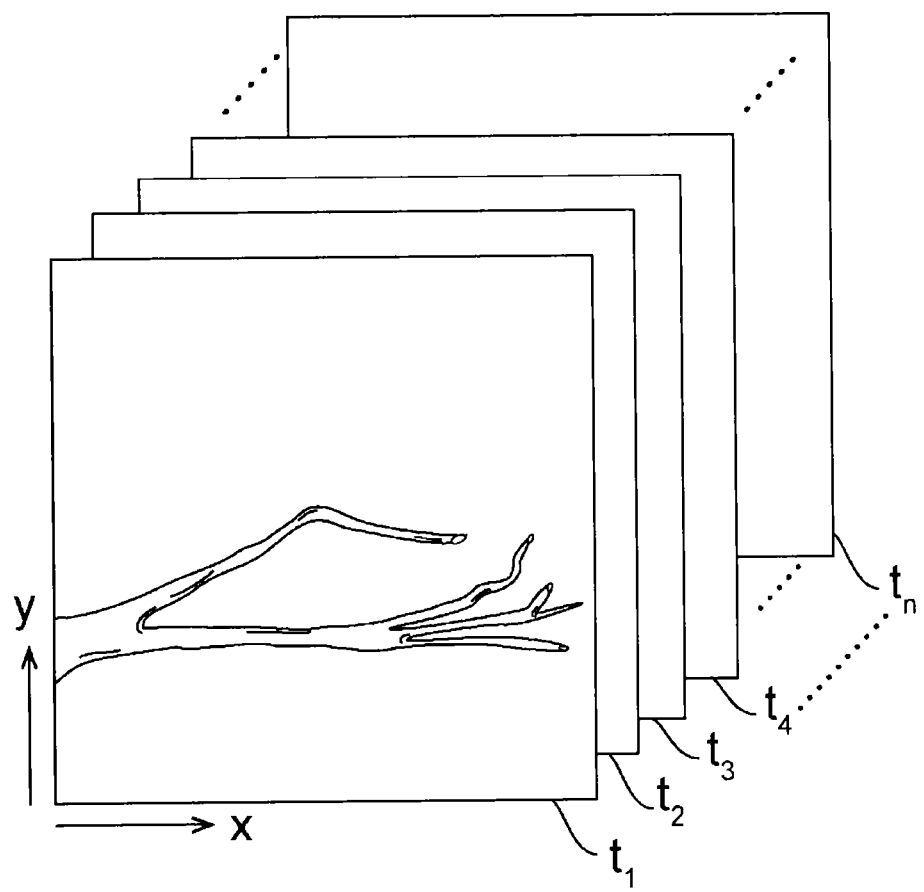
FIG. 13B is a schematic diagram illustrating a relationship among frames acquired over time.

With reference to FIGS. 13A and 13B, a description is given of an X-ray diagnosis apparatus according to the fifth embodiment. FIGS. 13A and 13B are schematic diagrams illustrating a relationship among frames acquired over time. The fifth embodiment includes a part common to each of the first to fourth embodiments, only the differences between the fifth embodiment and the above embodiments are described below. Note that underlying part is described based on the first embodiment.

In the first to fourth embodiments, medical image data is described as being volume data. In the fifth embodiment, medical image data is described as a group of a plurality of frames which are generated over time. The medical image data is acquired by, for example, continuously or intermittently scanning the same position of the subject. Further, each frame of the medical image data is a two-dimensional image.

In the first to fourth embodiments, a description is given of the configuration of the image processing apparatus 1. On the other hand, in the fifth embodiment, an X-ray diagnosis apparatus (not illustrated) is described as an example of a medical image diagnosis apparatus. In the X-ray diagnosis apparatus, for example, an imaging object of the subject is fixed and fluoroscoped. As a result of the fluoroscopy, X rays that have passed through the imaging object of the subject are detected, and a generator (not illustrated) generates the frames of an X ray image in different time phases on a predetermined time axis.

<Spatial Direction; First Example>

When the X-ray diagnosis apparatus performs fluoroscopy of, for example, the head of the subject, a plurality of frames $t_1$ to $t_n$ of an X-ray image are generated in relation to the head of the subject. For example, as illustrated in FIG. 13A, in each of the frames $t_1$ to $t_n$ of the X-ray image related to the head of the subject, an image of blood vessels of the head is drawn. In FIG. 13A, the running direction of the blood vessels illustrated in the frames $t_1$ to $t_n$ of the X-ray image of the head corresponds to the up-down direction of the figure (y direction). When fluoroscopy is performed for a standing subject, the up-down direction of the figure is replaced by the vertical direction in the real space, for example. When fluoroscopy is performed for a lying subject, the up-down direction of the figure is replaced by the horizontal direction in the real space, for example. As described above, blood vessels of the head tend to run in the up-down direction in an X-ray image.

In the fifth embodiment, the specifying unit of the X-ray diagnosis apparatus estimates the running direction of a blood vessel based on a target region for an X-ray image, and sets the order setting information so that the last noise reduction is performed in a plane perpendicular to the running direction. In the first example, since the running direction of the blood vessel illustrated in the frames $t_1$ to $t_n$ of the X-ray image (medical image data) is the up-down direction of the figure (y direction), the specifying unit (not illustrated) determines that the last noise reduction is to be performed in a plane perpendicular to the main running direction of the blood vessel, i.e., in the left-right and time plane (see FIG. 13A).

<Spatial Direction; Second Example>

When the X-ray diagnosis apparatus performs fluoroscopy of, for example, the abdomen of the subject, a plurality of frames $t_1$ to $t_n$ of an X-ray image are generated in relation to the abdomen of the subject. For example, as illustrated in FIG. 13B, in each of the frames $t_1$ to $t_n$, an image of blood vessels of the abdomen is drawn. In FIG. 13B, the running direction of the blood vessels illustrated in the frames $t_1$ to $t_n$ of the X-ray image of the abdomen corresponds to the left-right direction of the figure (x direction). When fluoroscopy is performed for a standing subject, the left-right direction is replaced by the horizontal direction in the real space, for example. When fluoroscopy is performed for a lying subject, the left-right direction is replaced by the vertical direction in the real space, for example. As described above, blood vessels of the abdomen tend to run in the left-right direction in an X-ray image.

In the second example, since the running direction of the blood vessel illustrated in each of the frames $t_1$ to $t_n$ is the left-right direction of the figure (x direction), the specifying unit determines that the last noise reduction is to be performed in a plane perpendicular to the main running direction of the blood vessel, i.e., in the up-down and time plane (see FIG. 13B).

<Time Direction>

As illustrated in FIGS. 13A and 13B, in the fifth embodiment, the frames $t_1$ to $t_n$ of X-ray images are generated in different time phases on a predetermined time axis. In the fifth embodiment, noise reduction is performed between the corresponding positions of the frames $t_1$ to $t_n$.

For example, if fluoroscopy is performed on a fixed subject, it is estimated that at least a part of the region to be fluoroscoped is not deformed, or even if deformed, the amount is small. Accordingly, it is expected that the same structure be drawn in the same coordinate position in each frame in each time phase.

Noise may exist in each position common in the frames $t_1$ to $t_n$. For this reason, the X-ray diagnosis apparatus of the fifth embodiment performs noise reduction based on the pixel value of the common position in the frames $t_1$ to $t_n$.

For example, the X-ray diagnosis apparatus specifies corresponding pixels in the frames $t_1$ to $t_n$ in different time phases on a predetermined time axis. If a moving structure such as the heart is to be observed, there is a body movement or the like of the subject. In this case, the same structure is not always illustrated at the same coordinate position in each frame. Accordingly, there are cases where positioning is performed between the frames $t_1$ to $t_n$.

The image processor (not illustrated) of the X-ray diagnosis apparatus obtains the difference between the pixel values of the frames. The image processor changes the weight according to the difference. Further, referring to the weight based on the common position of the frames, the image processor performs noise reduction on a predetermined frame $t_\alpha$.

When a fluoroscopic image is to be displayed in real time, the image processor performs noise reduction using a frame in a time phase prior to the frame to be processed. That is, if noise reduction is performed on a frame $t_4$ in the example of FIGS. 13A and 13B, the noise reduction is performed by using frames $t_1$ to $t_4$. The noise reduction using the frames $t_1$ to $t_4$ uses less frames than in usual noise reduction. This is because the use of frames $t_5$ to $t_n$ acquired after the frame $t_4$ to be treated with noise reduction, or the use of an increased number of frames for performing noise reduction may impair the real-time performance. The number of frames used in noise reduction processing is set in advance.

On the other hand, if a fluoroscopic image is not required to be displayed in real time, the image processor may use a frame acquired after the frame to be processed as well as a previous frame to improve the accuracy of noise reduction.

For example, the image processor may use all the frames $t_1$ to $t_n$ contained in medical image data when performing noise reduction on a frame.

<Order of Noise Reduction Processing>

In the fifth embodiment, three directions including the time direction as well as vertical and horizontal directions of each frame may be defined as the directions in which noise reduction is performed in medical image data.

Of these, regarding the time direction ($t_1$ to $t_n$), as described above, the similarity of pixels tends to be high. Besides, depending on the state and characteristics of the object of interest, the similarity of pixels varies. From these trends, the order of noise reduction processing by the image processor may be changed according to the state and characteristics of an object that the operator is interested in.

According to the embodiment, the X-ray diagnosis apparatus is configured to perform noise reduction in each of three directions perpendicular to one another to reduce noise in sequential frames. Therefore, as compared to the configuration in which noise reduction is performed two-dimensionally a plurality of times on each frame to achieve the noise reduction effect, edge blur is prevented in the image of the frame. As a result, it is possible to suppress the reduction of the resolution of each frame. Further, unlike the configuration in which noise reduction is performed two-dimensionally a plurality of times on each frame, noise reduction applied to a frame in a time phase does not conform to frames in other time phases. Thus, it is possible to suppress the reduction of the resolution of the frames.

In the X-ray diagnosis apparatus of the embodiment, the order of noise reduction processing is set in advance with respect to three directions including the time direction and two directions perpendicular to each other in each frame.

With this configuration, it is possible to suppress the reduction of the spatial resolution of the entire sequential frame data due to smoothing between pixels that represent dissimilar structures.

Although the fifth embodiment is described as being applied to the X-ray diagnosis apparatus, it may also be applied to the image processing apparatus 1 which acquires sequential volume data.

Sixth Embodiment

In the following, the sixth embodiment is described. The sixth embodiment includes a part common to each of the first to fifth embodiments, only the differences between the sixth embodiment and the above embodiments are described below. Note that underlying part is described based on the first embodiment.

Medical image data is generated based on data acquired based on the scanning conditions (imaging conditions, fluoroscopic conditions, etc.) which are set for each part of the subject. For example, in an X-ray diagnosis apparatus, a focal spot size, a target region and the like are set as scanning conditions according to a target region and an examination purpose. In addition, image processing conditions are also set correspondingly to the scanning conditions. In the sixth embodiment, the image processing conditions include the setting of the order of noise reduction processing in each direction of the medical image data. The combination of the scanning conditions and the image processing conditions are referred to as "protocol".

For example, it is assumed that protocol to define the "head" as a target region and "intervention" as an examination purpose has been set. Since the target region is the head in this protocol, as described above, the main running direction of blood vessels of the target region is a direction perpendicular to the standing subject. Thus, in the order of noise reduction processing in the image processing conditions, the up-down and time plane is set to be treated with the first noise reduction, a plane corresponding to sequential frames is set to be treated with the second noise reduction, and a plane perpendicular to the running direction and time is set to be treated with the last noise reduction. According to the order thus set, the image processor of the image processing apparatus or the X-ray diagnosis apparatus performs noise reduction on medical image data.

For another example, it is assumed that protocol to define the "liver" or the "lower extremities" as a target region has been set. In this protocol, the main running direction of blood vessels of the target region is a direction horizontal to the standing subject. Thus, in the order of noise reduction processing in the image processing conditions, a plane perpendicular to the horizontal direction and time is set so that the last noise reduction is performed in the direction. According to the order thus set, the image processor of the image processing apparatus or the X-ray diagnosis apparatus performs noise reduction on medical image data.

According to the embodiment described above, by simply setting a target region, an examination purpose, and the like, the order of noise reduction processing can also be set for medical image data. Thus, it is possible to reduce the user's setting operation. As a result, it is possible to improve the efficiency of examination or interpretation.

Modification of the Embodiments

In the first to sixth embodiments described above, the image processor of the image processing apparatus or the X-ray diagnosis apparatus is described as performing noise reduction in each of three different directions. However, it is not so limited. For example, the image processor may perform noise reduction on two of the three different directions. In medical image data, in a direction in which the similarity of pixels tends to be low, noise may be reduced as a result of noise reduction performed in the other two directions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
    processing circuitry configured to
        acquire medical image data that is three-dimensional volume data,
        perform the noise reduction with a spatial filter in at least two of three different planes having different directions in the medical image data in an order set according to a site of a subject in the medical image data to obtain the volume data with less noise, wherein
    the medical image data contains a plurality of feature points in the subject, and
    the processing circuitry is further configured to obtain a specific plane where an average of distances from the feature points are minimum, and set the order based on one of the three different directions that is closest to the specific plane.

2. The image processing apparatus of claim 1, wherein the medical image data indicates a state of a three-dimensional region of the subject.

3. The image processing apparatus of claim 1, wherein the medical image data includes a plurality of frames generated over time, and
one of the three different planes is a time direction that indicates a time axis of the frames.

4. The image processing apparatus of claim 2, wherein the processing circuitry is further configured to perform the noise reduction in each of the three different planes in the medical image data.

5. The image processing apparatus of claim 1, wherein the processing circuitry is configured to
obtain a matching degree between a pixel value of a target pixel to be treated with the noise reduction and pixel values of neighboring pixels around the pixel of interest,
determine a weight of each of the neighboring pixels according to the matching degree between the pixel of interest and each of the neighboring pixels,
obtain a weighted average of the neighboring pixels based on the weight, and
obtain a pixel value of the target pixel based on the matching degree and the weighted average.

6. The image processing apparatus of claim 2, wherein the three different planes are an axial plane, a coronal plane, and a sagittal plane perpendicular to one another.

7. The image processing apparatus of claim 6, wherein the set order in which the processing circuitry performs the noise reduction is set such that a last noise reduction is performed in a plane with a largest angle to a body axis of the subject.

8. The image processing apparatus of claim 7, wherein the set order in which the processing circuitry performs the noise reduction is set such that first noise reduction is performed in the sagittal plane.

9. The image processing apparatus of claim 7, wherein the set order in which the processing circuitry performs the noise reduction is set such that first noise reduction is performed in the coronal plane.

10. The image processing apparatus of claim 4, further comprising an operation interface configured to be used to set the three different planes, wherein
the set order in which the processing circuitry performs the noise reduction is set based on the planes set by the operation interface.

11. The image processing apparatus of claim 2, wherein the medical image data contains a plurality of feature points in the subject,
the three different planes are an axial plane, a coronal plane, and a sagittal plane perpendicular to one another, and
the set order in which the processing circuitry performs the noise reduction is set such that a last noise reduction is performed on a cross section with a largest variance of distances from the feature points among cross sections corresponding to the three different planes.

12. The image processing apparatus of claim 1, wherein the three different planes are an axial plane, a coronal plane, and a sagittal plane,
three orthogonal cross sections including a first cross section, a second cross section, and a third cross section are set based on the axial plane, the coronal plane, and the sagittal plane, and
the set order in which the processing circuitry performs the noise reduction is set such that a last noise reduction is performed on one of the three orthogonal cross sections with a largest inner product of unit normal vector thereof and unit normal vector of the specific plane.

13. The image processing apparatus of claim 1, wherein the three different planes are an axial plane, a coronal plane, and a sagittal plane,
three orthogonal cross sections including a first cross section, a second cross section, and a third cross section are set based on the axial plane, the coronal plane, and the sagittal plane, and
the set order in which the processing circuitry performs the noise reduction is set such that a last noise reduction is performed on one of the three orthogonal cross sections with a smallest angle to the specific plane.

14. The image processing apparatus of claim 1, wherein the processing circuitry is further configured to set a cross section along the feature points as one of the three different planes.

15. The image processing apparatus of claim 14, wherein the set order in which the processing circuitry performs the noise reduction is set such that a last noise reduction is performed in the cross section along the feature points.

16. The image processing apparatus of claim 1, wherein the medical image data contains information indicating a blood vessel of the subject and information indicating a stent that is placed in the blood vessel and provided with stent markers at both ends,
the information indicating the stent markers indicates the feature points in the medical image data, and
the processing circuitry is further configured to
obtain a coordinate position of each of the stent markers by performing threshold processing on the medical image data, and
specify a plane including a plurality of coordinate positions obtained.

17. The image processing apparatus of claim 1, wherein the medical image data contains information indicating a head of the subject,
each of the feature points represents a portion of the head of the subject having a characteristic shape in the medical image data, and
the processing circuitry is further configured to
specify a plurality of different feature points of the head by specifying a shape in the medical image data, and obtain coordinate positions of the feature points, and
obtain a specific plane where an average of distances from the coordinate positions is minimum.

18. The image processing apparatus of claim 1, wherein the processing circuitry is further configured to set the order of the noise reduction depending on a region of the subject in the medical image data.

19. The image processing apparatus of claim 18, wherein the processing circuitry is further configured to set a plane in which a last noise reduction is performed depending on a running direction of a blood vessel of the subject in the medical image data.

20. The image processing apparatus of claim 4, wherein the medical image data is generated based on scanning conditions set for each region of the subject, the scanning conditions are associated with image processing conditions including the set order of the noise reduction, and the processing circuitry is configured to perform the noise reduction according to the set order in the image processing conditions.

21. The image processing apparatus of claim 1, wherein the medical image data includes a plurality of frames generated over time, one of the three different planes is a time direction that indicates a time axis of the frames, and the processing circuitry is further configured to perform the noise reduction on one of the frames using a plurality of previous and subsequent frames.

22. The image processing apparatus of claim 1, wherein the medical image data includes a plurality of frames generated over time, one of the three different planes is a time direction that indicates a time axis of the frames, and the processing circuitry is further configured to perform the noise reduction on one of the frames using the frame and a plurality of previous frames.

23. An image processing method, comprising:

acquiring medical image data that is three-dimensional volume data, performing the noise reduction with a spatial filter in at least two of three different planes having different directions in the medical image data in an order set according to a site of a subject in the medical image data to obtain the volume data with less noise, wherein the medical image data contains a plurality of feature points in the subject, the method further comprising obtaining a specific plane where an average of distances from the feature points are minimum, and setting the order based on one of the three different directions that is closest to the specific plane.

24. An X-ray diagnosis apparatus, comprising:

processing circuitry configured to
generate medical image data that is three-dimensional volume data,
perform the noise reduction with a spatial filter in at least two of three different planes having different directions in the medical image data in an order set according to a site of a subject in the medical image data to obtain the volume data with less noise, wherein the medical image data contains a plurality of feature points in the subject, and the processing circuitry is further configured to obtain a specific plane where an average of distances from the feature points are minimum, and set the order based on one of the three different directions that is closest to the specific plane.

25. The X-ray diagnosis apparatus of claim 24, wherein the medical image data includes a plurality of frames generated over time, one of the three different planes is a time direction that indicates a time axis of the frames, and the processing circuitry is further configured to perform the noise reduction on one of the frames using the frame and a plurality of previous frames.

26. The X-ray diagnosis apparatus of claim 25, wherein the medical image data is generated based on scanning conditions set for each site of a subject, the scanning conditions are associated with image processing conditions including the set order of the noise reduction, and the processing circuitry is further configured to perform the noise reduction according to the set order in the image processing conditions.

27. The image processing apparatus of claim 3, wherein the processing circuitry is further configured to perform the noise reduction in each of the three different planes in the medical image data.

\* \* \* \* \*